(12) United States Patent
Irving et al.

(10) Patent No.: US 11,813,882 B2
(45) Date of Patent: *Nov. 14, 2023

(54) INKJET PRINTED ARTICLES AND METHOD OF MAKING

(71) Applicant: Eastman Kodak Company, Rochester, NY (US)

(72) Inventors: Mark Edward Irving, Rochester, NY (US); Douglas Eugene Bugner, Rochester, NY (US); David D. Putnam, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/324,394

(22) Filed: May 19, 2021

(65) Prior Publication Data

US 2022/0379646 A1    Dec. 1, 2022

(51) Int. Cl.
| | |
|---|---|
| *B41M 5/50* | (2006.01) |
| *C09D 11/38* | (2014.01) |
| *C09D 11/322* | (2014.01) |
| *C09D 11/106* | (2014.01) |
| *C09D 139/06* | (2006.01) |
| *C09D 129/04* | (2006.01) |
| *B41M 5/00* | (2006.01) |
| *C09D 139/02* | (2006.01) |
| *C08K 3/22* | (2006.01) |

(52) U.S. Cl.
CPC .......... *B41M 5/502* (2013.01); *B41M 5/0023* (2013.01); *C09D 11/106* (2013.01); *C09D 11/322* (2013.01); *C09D 11/38* (2013.01); *C09D 129/04* (2013.01); *C09D 139/02* (2013.01); *C09D 139/06* (2013.01); *C08K 3/22* (2013.01); *C08K 2003/2241* (2013.01)

(58) Field of Classification Search
CPC ..... B41M 5/502; B41M 5/003; C09D 11/106; C09D 11/322; C09D 11/38; C09D 129/04; C09D 139/02; C09D 139/06; C08K 3/22; C08K 2003/2241
USPC ........................................................ 427/256
See application file for complete search history.

(56) References Cited

U.S. PATENT DOCUMENTS

| | | |
|---|---|---|
| 4,554,181 A | 11/1985 | Cousin et al. |
| 5,449,552 A | 9/1995 | Bochow et al. |
| 7,104,643 B2 | 9/2006 | Glass et al. |
| 7,199,182 B2 | 4/2007 | Tanaka et al. |
| 8,173,215 B2 | 5/2012 | Sowinski et al. |

(Continued)

*Primary Examiner* — Brian K Talbot
(74) *Attorney, Agent, or Firm* — J. Lanny Tucker

(57) ABSTRACT

An aqueous composition can be used for pre-treating a substrate prior to inkjet printing to provide a white opaque background for inkjet-printed images. This aqueous composition includes: (a) one or more water-soluble salts of a multivalent metal cation at 5-30 weight %; (b) a nonionic or cationic water-soluble or water-dispersible polymeric binder material at 5-30 weight %; and (c) surface-treated visible light-scattering particles having a $D_{50}$ (median) particle size of at least 0.04 μm and up to and including 2 μm in an amount of 5-60 weight % based on the total aqueous composition weight. The pre-treated substrate is useful as an inkjet receiving medium that can be readily inkjet-printed particularly with anionically-stabilized aqueous pigment-based inks.

20 Claims, 2 Drawing Sheets

(56) References Cited

U.S. PATENT DOCUMENTS

| | | | |
|---|---|---|---|
| 8,562,126 B1 * | 10/2013 | Xiang | C08G 73/0611 |
| | | | 347/101 |
| 8,764,161 B2 | 7/2014 | Cook et al. | |
| 9,010,909 B2 * | 4/2015 | Nelson | C09D 11/38 |
| | | | 347/73 |
| 9,067,448 B2 * | 6/2015 | Dannhauser | B41M 5/0017 |
| 9,376,582 B1 | 6/2016 | Dannhauser et al. | |
| 9,421,808 B2 | 8/2016 | Ferrar et al. | |
| 9,427,975 B2 | 8/2016 | Bugner et al. | |
| 9,434,201 B2 | 9/2016 | Dannhauser et al. | |
| 9,994,723 B2 | 6/2018 | Bauer et al. | |
| 10,022,944 B2 | 7/2018 | Schuman et al. | |
| 10,059,853 B2 | 8/2018 | Bauer et al. | |
| 10,093,817 B2 | 10/2018 | Bauer et al. | |
| 10,208,218 B2 | 2/2019 | Bauer et al. | |
| 10,926,565 B1 * | 2/2021 | Irving | B41M 5/506 |
| 11,155,076 B2 | 10/2021 | Lussier et al. | |
| 11,459,463 B2 * | 10/2022 | Itoh | C09D 5/36 |
| 2003/0203134 A1 | 10/2003 | Sheng | |
| 2005/0129879 A1 | 6/2005 | Bodis | |
| 2006/0075916 A1 | 4/2006 | Edwards et al. | |
| 2006/0077244 A1 | 4/2006 | Edwards | |
| 2006/0147659 A1 * | 7/2006 | Foley | B41M 5/52 |
| | | | 428/32.24 |
| 2006/0263550 A1 * | 11/2006 | Nichols | B41M 5/52 |
| | | | 428/32.34 |
| 2009/0074995 A1 * | 3/2009 | Dannhauser | B41M 5/52 |
| | | | 347/100 |
| 2009/0220695 A1 | 9/2009 | Oyanagi et al. | |
| 2011/0117359 A1 * | 5/2011 | de Santos Avila | C09D 7/70 |
| | | | 428/323 |
| 2011/0279554 A1 * | 11/2011 | Dannhauser | D21H 19/44 |
| | | | 347/73 |
| 2012/0287211 A1 | 11/2012 | Sano | |
| 2014/0292902 A1 | 10/2014 | Ka Ata et al. | |
| 2018/0051184 A1 | 2/2018 | Lussier et al. | |
| 2018/0105646 A1 * | 4/2018 | Palumbo | C09C 3/10 |
| 2020/0062017 A1 | 2/2020 | Irving et al. | |
| 2020/0369902 A1 * | 11/2020 | Loccufier | C09D 11/102 |

* cited by examiner

INKJET PRINTED ARTICLES AND METHOD OF MAKING

CROSS-REFERENCE TO RELATED APPLICATIONS

Reference is made to provisional application U.S. Ser. No. 63/093,869, filed Oct. 20, 2020 by Irving. Bugner, and Putnam.

Reference is also made to copending and commonly assigned U.S. Ser. No. 17/324,362, filed on May 19. 2021, by Irving, Bugner, and Putnam, and entitled "Aqueous Compositions and Inkjet Receiving Media", the disclosure of which is incorporated herein by reference.

FIELD OF THE INVENTION

This invention relates to the field of inkjet printing. More particularly, it relates to a method for inkjet printing onto inkjet receiving medium that have been treated with an aqueous composition as a pre-treatment to form an opaque ("white") coating or pattern. This method can be used to provide inkjet-printed articles having image properties.

BACKGROUND OF THE INVENTION

It is well known to deposit aqueous inks, particularly those having anionically-stabilized dispersed pigment colorants onto a substrate having cations of a multivalent metal salt on the surface thereof. The presence of such multivalent metal cations can be used to prevent deposited ink drops from penetrating too far below the surface of a water-absorptive substrate, thereby preventing a lowering of optical density. The multivalent metal cations can also be used to prevent bleeding or coalescing of adjacent deposited ink drops of the same or different colors on a less absorbent substrate such as a hydrophobic substrate, thereby preventing the formation of blurry or grainy appearing images. Surface treatments comprising aqueous salts of multivalent metal ions are particularly advantageous for high speed printing with page-wide inkjet arrays whereby adjacent drops of ink are deposited within just a few microseconds of each other onto the substrate.

U.S. Pat. No. 9,067,448 (Dannhauser et al.) and U.S. Pat. No. 9,434,201 (Dannhauser et al.) describe inkjet receiving media suitable for high speed inkjet printing, which media include a substrate having a topmost layer coated thereon comprising an aqueous soluble salt of a multivalent metal cation and a crosslinked hydrophilic polymer binder. Inorganic particles of various types may also be present in this topmost layer.

U.S. Pat. No. 8,562,126 (Xiang et al.) describes inkjet receiving media comprising a substrate and a topmost layer coated thereon, wherein the topmost layer includes one or more aqueous soluble salts of multivalent metal cations, a cationic polyelectrolyte comprising amidine moieties, and a second polymer that is distinct from the cationic polyelectrolyte comprising amidine moieties.

Improvements in inkjet-printed image durability can be provided using the teaching of U.S. Pat. No. 9,427,975 (Bugner et al.) in which an inkjet-printed image on inkjet receiving media is immediately dried after printing, subjected to pure water and heat, and then returned to ambient conditions.

The inkjet receiving media known in the art for high-speed inkjet printing using anionically-stabilized aqueous pigment-based inks are sometimes low in opacity or even transparent, and in many instances, the inkjet-receptive layers on these media such as those described in the patents described above, are also visually clear and transparent or translucent. However, when inkjet printing on clear film substrates or on dark-colored substrates, it is often desirable to include a "white" opaque layer or pattern under the subsequently inkjet-printed image of various colors.

This objective may be attempted by inkjet-printing a layer of white ink, such as one described in U.S. Pat. No. 9,994,723 (Bauer et al.), before applying a known ink-receptive layer formulation. While this approach can provide some opacity in the inkjet receptive media, it adds to the cost of manufacturing by having a separate ink deposition step and associated hardware. Multiple layer formation on a substrate requires a careful optimization of the multi-step operations to ensure good adhesion and to avoid adverse interactions between the layer. Moreover, the application of a white ink may not provide the desired opacity to the resulting inkjet receptive media.

To avoid these problems, there has been an effort to provide white opaque layers prior to inkjet printing using flexography or gravure printing of "white" pigmented compositions. However, attempts to inkjet print directly onto pre-printed white layers applied in this manner, using anionically-stabilized, aqueous pigment-based inks have resulted in highly variable or unacceptable image quality.

Certain types of white ink-receptive layers have been proposed in the art, which are formed as microporous layers or contain cationic fixing agents. These white ink-receptive layers, however, are relatively thick and are not suitable for high-speed inkjet printing on a commercial scale particularly when anionically-stabilized aqueous pigment-based inkjet inks are to be used.

Thus, there is a need to provide white backgrounds, either in uniform layers or patterns that are relatively thin and have high opacity, and it is desirable to provide such ink-receptive layers or patterns at high speeds using either flexography or gravure coating or inkjet printing techniques. In particular, there is a need to provide such white backgrounds upon which anionically-stabilized aqueous pigment-based inks can be inkjet-printed at high speeds in commercial operations to provide high quality monochrome or polychrome images, all with excellent adhesion: between the white background and the underlying substrate, between the white background and a subsequently inkjet-printed image, and between the white background and any subsequent protective or adhesive layer or coating that may be applied over it downstream from the inkjet printing operations.

SUMMARY OF THE INVENTION

To address the problems described above, the present invention provides a method for inkjet printing, comprising, in order:

A) providing an inkjet receiving medium comprising a substrate and a topcoat composition disposed on a surface thereof, which topcoat composition comprises the following (a), (b), and (c) components:
  (a) one or more water-soluble salts of a multivalent metal cation, which (a) one or more water-soluble salts are present in an amount of at least 0.4 weight % and up to and including 40 weight %;
  (b) one or more nonionic or cationic water-soluble or water-dispersible polymeric binder materials that are present in an amount of at least 0.5 weight % and up to and including 90 weight %; and (c) visible light-scattering particles that have been surface-treated and that are present in an amount of at least 6 weight % and up to and including 90 weight %, wherein the amounts of the (a), (b), and (c) components are based on the total weight of the topcoat composition; and B) inkjet printing one or more aqueous pigment-based inks onto the topcoat composition to provide a pigment-based image or layer.

In some embodiments of the method of the present invention, the substrate comprises a transparent or translucent polymeric film, and the topcoat composition has a dry solids coating weight of at least 0.2 g/m$^2$ and up to and including 2 g/m$^2$, and the topcoat composition comprises:

the (a) one or more water-soluble salts of magnesium (+2), calcium (+2), barium (+2), or a mixture thereof, which (a) one or more water-soluble salts are present in an amount of at least 0.4 weight % and up to and including 40 weight %, based on the total weight of the topcoat composition;

the (b) one or more nonionic or cationic water-soluble or water-dispersible polymeric binder materials that comprise at least a polyvinyl alcohol, a polyvinyl amine, polyethylene imine, a copolymer derived at least in part from vinyl amine and vinyl alcohol, or a combination of two or more of these polymeric materials, the (b) one or more nonionic or cationic water-soluble or water-dispersible polymeric binder materials are present in an amount of at least 2 weight % and up to and including 90 weight %, based on the total weight of the topcoat composition;

the (c) visible light-scattering particles comprising visible light-scattering titanium dioxide particles, which have been surface-treated and that exhibit a $D_{50}$ particle size of at least 0.04 μm and up to and including 2 μm, as measured using a particle size analyzer that provides a volume-weighted particle size distribution, and which are present in an amount of at least 6 weight % and up to and including 90 weight %, based on the total weight of the topcoat composition;

(d) particles different from the (c) component, which (d) particles have a Rockwell Hardness of less than or equal to R75, and which are present in an amount of at least 0.06 weight % and up to and including 10 weight %, based on the total weight of the topcoat composition;

(e) a crosslinkable polymeric material that is different from all of the (a), (b), (c), and (d) components, and which (e) crosslinkable polymeric material is present in an amount of at least 0.1 weight % and up to and including 20 weight %, based on the total weight of the topcoat composition; and (f) a dispersing aid for the (c) surface-treated visible light-scattering titanium dioxide particles, which (f) dispersing aid is a polymer having a protonated nitrogen atom and is present in the topcoat composition in an amount of at least 0.2 weight % and up to and including 50 weight %, based on the total weight of the (c) surface-treated visible light-scattering titanium dioxide particles.

In addition, the present invention provides a method for providing an inkjet-printed article, comprising, in order:

A') providing a substrate having a surface,

A") providing an inkjet receiving medium by disposing an aqueous composition onto the surface of the substrate to form a topcoat composition, which aqueous composition has at least 2% solids and up to and including 90% solids, and the aqueous composition comprises the following (a), (b), and (c) components:

(a) one or more water-soluble salts of a multivalent metal cation, which (a) one or more water-soluble salts are present in an amount of at least 0.5 weight % and up to and including 30 weight %;

(b) one or more nonionic or cationic water-soluble or water-dispersible polymeric binder materials that are present in an amount of at least 0.1 weight % and up to and including 30 weight %; and (c) visible light-scattering particles that have been surface-treated such that the aqueous composition has a stable zeta potential of greater than +4 millivolts, and which are present in an amount of at least 5 weight % and up to and including 60 weight %, wherein the amounts of the (a), (b), and (c) components are based on the total weight of the aqueous composition; and B) inkjet printing one or more aqueous pigment-based inks onto the topcoat composition to provide a pigment-based image or layer.

Further, an inkjet-printed article of the present invention comprises:

a substrate comprising a surface;

a topcoat composition disposed on the substrate surface, the topcoat composition comprising the following (a), (b), and (c) components:

(a) one or more water-soluble salts of a multivalent metal cation, which (a) one or more water-soluble salts are present in an amount of at least 0.4 weight % and up to and including 40 weight %;

(b) one or more nonionic or cationic water-soluble or water-dispersible polymeric binder materials that are present in an amount of at least 2 weight % and up to and including 90 weight %; and (c) visible light-scattering particles that have been surface-treated and that are present in an amount of at least 6 weight % and up to and including 90 weight %, wherein the amounts of the (a), (b), and (c) components are based on the total weight of the topcoat composition; and disposed over the topcoat composition, a pigment-based inkjet-printed layer or image.

The present invention provides a means for providing a relatively-thin, white (opaque) background on various substrates, on which high quality inkjet-printed layers or images can be provided at high printing speeds These inkjet-printed layers or images exhibit excellent adhesion with the white background layer as well as excellent adhesion of the white background to the substrate. There is also excellent adhesion of the non-inkjet-printed areas of the white background topcoat composition to any subsequently applied coatings, such as protective overprint varnish coatings or laminating adhesives.

These advantages can be achieved by forming thin white or opaque layers or patterns in-line with inkjet printing, or they can be formed in separate pre-treatment operations. Moreover, the advantages of the present invention are particularly observed when the inkjet-printed images are obtained using anionically-stabilized aqueous pigment-based inks during high-speed commercial printing operations and a multi-station apparatus.

More specifically, the advantages described herein are achieved using an inventive aqueous composition to pre-treat or provide a topcoat to a substrate to give it an opaque "white" coating or image (pattern) before inkjet printing is carried out. Such aqueous compositions have the unique features described herein, that is, (a) one or more water-soluble salts of a multivalent metal cation, (b) suitable water-soluble or water-dispersible polymeric binder materials, and (c) surface-treated visible light-scattering particles. The resulting inkjet receiving media provided using the present invention can exhibit an opacity of at least 30% as determined by the TAPPI 425 OP-16 test, and a colorimetry defined by an a* value of at least −5 and to and including +5 and a b* value of at least −5 and to and including +5.

DETAILED DESCRIPTION OF THE INVENTION

Figure 1:
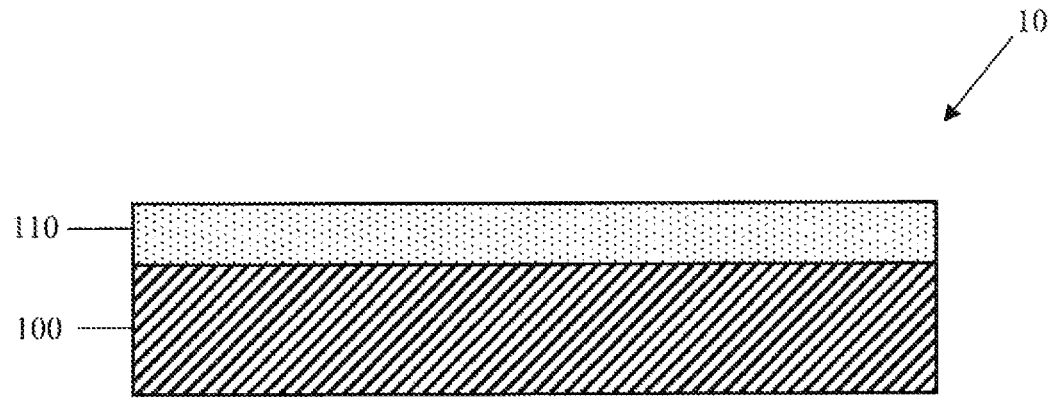
FIG. 1 shows a partial cross-sectional view of a simple embodiment of an inkjet receiving medium according to the present invention.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described in the discussion of any specific embodiment.

Definitions

As used herein to define various components of the aqueous compositions for pre-treating, topcoat compositions, aqueous pigment-based inks, and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are to be considered as approximations as though the minimum and maximum values within the stated ranges were both preceded by the word "about." In this manner, slight variations above and below the stated ranges may be useful to achieve substantially the same results as the values within the ranges. In addition, unless otherwise indicated, the disclosure of these ranges is intended as a continuous range including every value between the minimum and maximum values as well as the end points of the ranges.

As used herein, the parameter "acid number" (also known as acid value) is defined as the milligrams (mg) of potassium hydroxide required to neutralize 1 g of the described acidic polymer.

The term "aqueous" in aqueous compositions, aqueous organic pigment dispersions, and aqueous pigment-based inks according to the present invention means that the water content is greater than 60 weight %, or at least 80 weight % based on the total weight of all solvents. Thus, water is the predominant solvent in such compositions.

Rockwell Hardness values for many polymeric materials can be learned from literature published on-line by Plastics International (http://www.plasticsintl.com) and the values can be measured according to ASTM D785-51.

Median particle size ($D_{50}$) as equivalent spherical diameter (ESD) particle size, in micrometers (μm), can be determined using a Horiba Particle Size Distribution Analyzer (Horiba Semiconductor) using procedures desired for use with this instrument, which analyzer provides a volume-weighted particle size distribution. The term D95 or the $95^{th}$ percentile particle size refers to the classified particle size distribution such that 95% of the particles have diameters smaller than the indicated diameter. Similarly, the term $D_{50}$ or the $50^{th}$ percentile particle size (or median particle size) refers to the classified particle size distribution such that 50% of the particles have diameters smaller than the indicated diameter. Such particle size measurements can be made using either laser diffraction (static) techniques or dynamic light-scattering techniques. However, for the purposes of the present invention including the working examples below, the $D_{50}$ and any D95 particle size values were obtained using a commercially available Horiba particle size analyzer (Model LA-920) that provides a particle size value from a volume weighted particle size distribution.

Other particle size measuring techniques and equipment are known in the art also. For example, laser diffraction techniques will also provide a volume weighted particle size distribution. Dynamic light-scattering techniques will provide an intensity-weighted particle size distribution. One such device for this purpose is a Nanotrac 150 NPA ultrafine particle analyzer (Microtrac, Inc.). Standard procedures for using such a device are described in National Institute of Standards and Technology (NIST) Special Publication 1200-6, *Measuring the Size of Nanoparticles in Aqueous Media Using Batch-Mode Dynamic Light-Scattering NIST-NCL Joint Assay Protocol, PCC*-1 Version 1.2, May 2015 and in ISO 22412:2017 *Particle Size Analysis-Dynamic Light-Scattering (DLS)*.

"Zeta potential" can be measured for purposes of this invention using a "Malvern Zetasizer Nano-ZS" (ZEN) apparatus (Malvern Pananalyticals). Zeta potential is obtained using this equipment from the electrophoretic mobility of the measured particles. Samples are analyzed in an undiluted state. Zeta potential is measured using a combination of the measurement techniques: Electrophoresis and Laser Doppler Velocimetry, sometimes called Laser Doppler Electrophoresis. This method measures how fast a particle moves in a liquid when an electrical field is applied that is, it measures the particle velocity.

The term "water-soluble" when used in reference to salts of multivalent metal cations refers to a solubility in water of at least 0.5 g of salt in 100 ml of water at 20° C.

Dynamic viscosity can be measured by any of well-known techniques. Preferred methods include measurement of the timing of mass flow through a capillary as in a capillary viscometer, or measurement of ball drop velocity through a fluid, using for example a rolling ball viscometer. Both a capillary flow viscometer and a commercially available Anton Paar Automated MicroViscometer (AMVn) employing the rolling ball technique can be used to measure the dynamic viscosities reported herein. All dynamic viscosity values disclosed herein were measured under gravity induced shear at approximately 24° C. to 26° C. It will be appreciated that the values cited are reported as centipoise (cP) or millipascal seconds (mPa-sec) and that 1 cP=$10^{-3}$ Pascal-seconds (Pa-sec) equals $10^{-2}$ dyne-sec/cm$^2$. While viscosities can be measured with high precision, viscosity values herein are reported to one or two decimal places only, and they are normally rounded values and not truncated values. All claims reciting dynamic viscosities are intended to be interpreted in terms of values in mPa-sec normally rounded to one decimal point.

The Wilhelmy plate method is a well-known technique for measuring the static surface tension of a fluid at a solid interface. The technique involves a plate of known dimensions, typically selected from a roughened platinum alloy, suspended from a balance. The plate is contacted with a fluid of interest and a vertical force is applied to the plate to form a liquid meniscus between the fluid and plate. The resulting surface tension is given according to equation (1):

$$\sigma = F/L \cos(\theta) \quad (1)$$

where σ is the surface tension of the liquid, F is the force acting on the balance (milli-Newtons/meter), L is the wetted length of the plate in millimeters, and θ is the contact angle between the plate and fluid.

Typically, the roughened platinum results in a contact angle very close to zero and the cosine of θ goes to 1. A complete theoretical treatment of the method can be found in, for example, "A Method for Determining Surface and Interfacial Tension Using a Wilhelmy Plate," *Colloid and Polymer Science*, 255 (7), pages 675-681. A number of commercially available instruments are known for measuring surface tension, however, the instrument used to report surface tension values in the present invention is a Krüss Model K10ST tensiometer.

The phrase "visible light-scattering particles" refers to pigments or other water-insoluble particles that uniformly scatter visible light such that, when present as a uniform layer on a surface, the layer will appear white and block the transmission of light from the underlying surface. The degree to which the layer hides the underlying surface determines the relative "opacity" of the layer.

The opacity of a printed white ink layer is commonly defined as the ratio of the CIE tristimulus value (Y) of the white layer measured over a black background ($Y_b$) to the same measurement of the white layer over a white background ($Y_w$). An instrument for measuring opacity in this manner is available from Hunter Labs, and the opacity when measured by this known technique is often referred to as Hunter Opacity: Hunter Opacity=$100\times(Y_b/Y_w)$.

The opacity of an inkjet receiving medium according to the present invention can also be defined as the ratio of the visual reflectance of a coated white topcoat composition used in the present invention measured over a black background ($R_b$), to the same measurement of the same coated white topcoat composition over a white background ($R_w$). This opacity is determined using the TAPPI 425 OP-16 opacity test: for example, Opacity=$100*(R_b/R_w)$. This standard opacity parameter is described in more detail by consulting the TAPPI standard for opacity that can be reviewed on-line at TAPPI.org or in various publications. This opacity parameter was measured and used for all of the working examples shown below.

CIELAB L*, a*, and b* values described herein have the known definitions according to CIE 1976 color space or corresponding later known published versions of color space and are determined using a standard D65 illuminant and known procedures. These values can be used to express a color as three numerical values, L* for the lightness (or brightness) of the color, a* for the green-red component of the color, and b* for the blue-yellow component of the color values.

For clarification of definitions for any terms relating to polymers, reference should be made to "Glossary of Basic Terms in Polymer Science" as published by the International Union of Pure and Applied Chemistry ("IUPAC"), Pure Appl. Chem. 68, 2287-2311 (1996). However, any definitions explicitly set forth herein should be regarded as controlling.

As used herein, the term "polymer" is used to describe compounds with relatively large molecular weights formed by linking together many small reacted monomers. As the polymer chain grows, it folds back on itself in a random fashion to form coiled structures. With the choice of solvents, a polymer can become insoluble as the chain length grows and become polymeric particles dispersed in the solvent medium. These particle dispersions can be very stable and useful in topcoat compositions described for use in the present invention. In this invention, unless indicated otherwise, the term "polymer" refers to a non-crosslinked material. Thus, crosslinked polymeric particles differ from the non-crosslinked polymeric particles in that the latter can be dissolved in certain organic solvents of good solvating property whereas the crosslinked polymeric particles may swell but do not dissolve in the organic solvent because the polymer chains are connected by strong covalent bonds.

The term "copolymer" refers to polymers composed of two or more different repeating or recurring units that are arranged along or pendant to the polymer backbone.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers.

Recurring units in some of the polymers described herein are generally derived from the corresponding ethylenically unsaturated polymerizable monomers used in a polymerization process, which ethylenically unsaturated polymerizable monomers can be obtained from various commercial sources or prepared using known chemical synthetic methods. For other polymers described herein, the repeating units in the active polymer can be the result of subsequent chemical reactions with the original repeating units used to make the polymer. For example, poly(vinyl alcohol) is derived from the hydrolysis of preformed poly(vinyl acetate), which in turn was made by polymerizing vinyl acetate.

Unless otherwise indicated, the term "weight %" refers to the amount of a component or material based on the total weight of an aqueous composition, aqueous formulation, or dry layer.

As used herein, the term "layer" or "coating" can consist of one disposed or applied layer or a combination of several sequentially disposed or applied layers, such as a combination of sub-layers. Unless otherwise noted, such layers or coatings are non-porous and contiguously cover the specific area of the substrate to which they are applied.

Percent (%) solids refers to the percentage by weight of non-volatile materials in a composition or solution, which can be determined using known gravimetric procedures.

Uses

The aqueous compositions described herein can be used to provide opaque inkjet-printable media ("inkjet receiving media") that can be advantageously used in aqueous inkjet printing methods, including those utilizing high-speed inkjet printing systems and anionically-stabilized aqueous pigment-based inks.

Aqueous "Pre-treatment" Compositions

The aqueous pre-treatment compositions (or "aqueous topcoat compositions" or simply "aqueous compositions") used according to the present invention generally have a solids content of at least 2% or at least 5%, and up to and including 70%, or up to and including 90%. Flexographic and gravure coating and inkjet printing techniques may require different optimal % solids to obtain the most desirable layers or patterns of topcoat compositions at the targeted opacities and dried thicknesses according to the present invention.

The aqueous composition used according to this invention can have a dynamic viscosity, as measured at 25° C. using Brookfield spindle viscometer (Model LVDV+, using spindle SC4-18) that can be obtained commercially, of less than or equal to 2000 centipoises (2000 mPa-sec) or of at least 30 centipoises (30 mPa-sec) and up to and including 800 centipoises (800 mPa-sec). Such viscometers having necessary spindle sets can be obtained from various commercial sources.

The aqueous compositions must comprise three essential (a), (b), and (c) components as defined below, in order to achieve the advantages of a thin opaque coating as described herein for the inkjet receiving media of the present invention. Such aqueous compositions can also include one or more of the optional (d), (e), and (f) components described below, and in some particularly useful embodiments, at least the (e) and (f) components are present with the essential (a), (b), and (c) components, and in other embodiments, all of the (d), (e), and (f) components are present with the essential (a), (b), and (c) components.

More specifically, the aqueous composition must contain (a) one or more water-soluble salts of a multivalent metal cation as an essential component. Mixtures of such salts having the same multivalent metal cation, and mixtures of salts having different multivalent cations can be used, in any desired proportion. Generally, each of these salts is colorless and non-reactive with other materials in the aqueous compositions.

Useful (a) one or more water-soluble salts can comprise one or more multivalent cations such as magnesium (+2), calcium (+2), barium (+2), zinc (+2), or aluminum (+3), or mixtures thereof. The magnesium (+2), calcium (+2), and barium (+2) cations, or combinations thereof, are particularly useful, in combination with suitable counterions.

Examples of useful (a) one or more water-soluble salts of a multivalent metal cation include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Hydrated versions of these salts can also be used. Other useful (a) water-soluble salts would be readily apparent to a skilled artisan. Particularly useful (a) water-soluble salts of a multivalent metal cation comprise one or more of $CaCl_2$, $Ca(CH_3CO_2)_2$, $MgCl_2$, $Mg(CH_3CO_2)_2$, $Ca(NO_3)_2$, or $Mg(NO_3)_2$, or hydrated versions of these salts. Useful (a) water-soluble salts of this type are readily available from various commercial sources.

The amount of the (a) water-soluble salts of multivalent metal cations in the aqueous composition used according to the present invention can be sufficient to provide at least 0.1 weight %, at least 0.5 weight %, or even at least 1 weight % and up to and including 25 weight % or up to and including 30 weight % solids, based on the total weight of the aqueous composition.

Another essential component of the aqueous composition is (b) one or more nonionic or cationic water-soluble or water-dispersible polymeric binder materials (identified herein also and particularly below in the working examples as "binder materials"). Such binder materials can include but are not limited to, poly(vinyl alcohol), polyethylene imine (including protonated polyethylene imine), polyethylene oxide, polyvinyl amine, copolymers derived at least in part from vinyl alcohol and ethylene oxide, copolymers derived at least in part from vinyl amine and vinyl alcohol, poly (vinyl pyrrolidone), cellulose materials (including cellulose and derivatives thereof, such as hydroxycellulose), gelatin and derivatives thereof, starches, cationic polyelectrolytes, polyurethanes, and silanol-modified poly(vinyl alcohol). Combinations of two or more of such binder materials can also be used. Such binder materials are generally capable of absorbing water and additionally capable of forming a continuous phase solution. Useful binder materials are readily available from various commercial sources or prepared using known synthetic methods and starting materials.

For example, a useful (b) nonionic or cationic water-soluble or water-dispersible polymeric binder material can be an acetylacetate-modified poly(vinyl alcohol). In cross-linked form, such (b) components in the resulting topcoat composition provide resistance to wet abrasion and increased cohesion of the dried layer.

Alternatively, the (b) one or more nonionic or cationic water-soluble or water-dispersible polymeric binder materials can comprise at least a polyvinyl amine, a polyethylene imine, a polyvinyl alcohol, a copolymer derived at least in part from vinyl amine and vinyl alcohol, or a combination of two or more of these binder materials.

More generally, the (b) one or more nonionic or cationic water-soluble or water-dispersible polymeric binder materials can be chosen from polyvinyl alcohol, a polyethylene oxide, a polyvinyl amine, a copolymer derived from at least in part from vinyl alcohol and ethylene oxide, a copolymer derived at least in part from vinyl amine and vinyl alcohol, or a combination of two or more of these binder materials.

Useful cationic polyelectrolytes that can be used in this manner can comprise amidine moieties, polyamide-epichlorohydrin polymers, polyamine solution polymers, as described in Cols. 9-10 of U.S. Pat. No. 9,067,448 (Dannhauser et al.), the disclosure of which is incorporated herein by reference.

Useful polyurethanes for this purpose can be dispersions of polyurethane particles in aqueous medium, for example as described also in U.S. Pat. No. 9,067,448 (Col. 10, lines 36-48). Useful silanol-modified poly(vinyl alcohol)s are also described in U.S. Pat. No. 9,067,448 (Col. 10, lines 49-68).

It is possible that the (b) one or more nonionic or cationic water-soluble or water-dispersible polymeric binder materials can be chosen so that they are also useful to surface treat or form the (c) surface-treated visible light-scattering particles as described in more detail below. Particularly useful binder materials useful for this purpose include but are not limited to, polymers having a protonated nitrogen atom such as polyvinyl amine, a protonated polyethylene imine, and a copolymer derived at least in part from vinyl amine and vinyl alcohol.

Such (b) one or more nonionic or cationic water-soluble or water-dispersible polymeric binder materials can be present in the aqueous composition in an amount of at least 0.1 weight %, or at least 1 weight %, and up to and including 8 weight % or up to and including 30 weight %, based on the total weight of the aqueous composition.

Moreover, the aqueous composition must include as another essential component, (c) visible light-scattering particles that have been surface-treated (that is "(c) surface-treated visible light scattering particles") as described herein, having a $D_{50}$ (median) particle size of at least 0.04 µm and up to and including 0.5 µm or up to and including 2 µm, which is determined as described above using a particle analyzer that provides a volume-weighted particle size distribution.

In some instances as observed below in the working examples, some embodiments of visible light-scattering particles and surface-treated visible light-scattering particles may be obtained having a $D_{50}$ (median) particle size greater than 2 μm, in which case such particles are outside the scope of the present invention, even though they still pass the "salt" test and provide the desired zeta potentials in the aqueous compositions. Such larger visible light-scattering particles can be desirably subjected to milling to reduce their $D_{50}$ (median) particle size to 2 μm or less.

Useful materials that can serve as the visible light-scattering particles include but are not limited to, silicon dioxide, zinc oxide, titanium dioxide, zirconium oxide, aluminum oxide, barium sulfate, magnesium oxide, or a combination of two or more of these materials. There are various commercial sources of such materials. All of these visible light-scattering particles can be surface-treated in a manner noted below. Particularly useful (c) surface-treated visible light-scattering particles comprise surface-treated visible light-scattering titanium dioxide particles.

Surface treatment of the visible light-scattering particles can be achieved by any suitable means. For example, it is possible to surface treat the visible light-scattering particles using one or more of the (f) dispersing aids described below. This can be accomplished by mixing the visible light-scattering particles with one or more (f) dispersing aids in a suitable solvent, such as water. The order of addition can vary. For instance, the visible light-scattering particles can be dispersed into the solvent first, followed by the addition of the (f) dispersing aid. The opposite order of addition can also be effective. However, in a single pot formulation, it is generally advised that the (a) one or more water-soluble salts of a multivalent cation be added after the addition of both the (c) surface-treated visible light-scattering particles and the (f) dispersing aid. The resulting (c) surface-treated visible-light scattering particles can also be provided with a shell using a positively-charged solid material to render the surface charge of the particles cationic. For instance, aluminum oxide can be used to surface treat visible light-scattering titanium dioxide particles in an amount of at least 1 weight % and up to and including 10 weight %, based on the total weight of the surface-treated visible light-scattering titanium dioxide particles.

The effect of such surface treatment is to give the aqueous composition according to this invention containing the (c) surface-treated visible light-scattering particles, a stable zeta potential of greater than +4 millivolts (mV), or greater than +5 mV, or even greater than +10 mV, over the intended life of the aqueous composition.

The (c) surface-treated visible light-scattering particles can be present in an amount of at least 5 weight % or at least 10 weight %, and up to and including 40 weight % or up to and including 60 weight %, based on the total weight of the aqueous composition.

The three essential (a), (b), and (c) components noted above can be mixed in suitable proportions, at a suitable temperature, and in a suitable order to obtain an aqueous composition according to the present invention. Representative examples of useful aqueous compositions are provided below in the working examples.

While not essential to achieving the desired advantages of the present invention, the aqueous compositions according to this invention can optionally comprise (d) particles having a Rockwell Hardness of less than or equal to R90, or less than or equal to R75. Rockwell Hardness can be determined as described above. These (d) particles are different from the (c) component described above.

Useful (d) particles can be chosen from various wax particles and other sufficiently soft polymer particles. Specific examples include but are not limited to, particles of polyethylene, poly(tetrafluoroethylene), polypropylene, ethylene bis-stearamide, synthetic hydrocarbon waxes, carnauba wax, and a combination of two or more types of these materials.

Some particularly useful (d) particles comprise domains of a (i) first organic polymer and domains of a (ii) second organic polymer, both of which organic polymers. The domains of the (ii) second organic polymer are dispersed, uniformly or non-uniformly, within the domains of the (i) first organic polymer. Moreover, the melting point of the (i) first organic polymer is lower than (by at least 30° C.) the melting point of the (ii) second organic polymer.

The weight ratio of the (i) first organic polymer to the (ii) second organic polymer is chosen such that the (d) particles have a density of at least 1.0 g/ml and up to and including 1.50 g/ml, or more likely of at least 1.05 g/ml and up to and including 1.35 g/ml, or even of at least 1.05 g/ml and up to and including 1.20 g/ml. Particle density can be determined using known procedures and equipment such as gas pycnometry or mercury porosimetry.

Useful polymeric materials that can form the (i) first organic polymer domains include but are not limited to, a polyethylene, a polypropylene, ethylene bi-stearamide, polyethylene-polypropylene copolymer, carnauba wax, a synthetic hydrocarbon wax (especially those produced by the Fischer-Tropsch process as described in Industrial Waxes, Vol. 1 by H. Bennett), a polyamide, and a combination of two or more of these materials.

Useful polymeric materials that can form the (ii) second organic polymer domains include but are not limited to, poly(tetrafluoroethylene) (PTFE or Teflon).

The mode average equivalent spherical diameter (ESD) particle size of the (d) particles can be at least 2 μm or at least 3 μm, and up to and including 8 μm, or up to and including 12 μm. The ESD of such particles can be adapted so that it is at least 0.1 μm greater, or at least 0.2 μm greater, than the sum of the dry thickness of the topcoat composition (described below) and any dry inkjet-printed image or layer (described below).

The amount of useful (d) particles present in the aqueous composition is generally at least 0.02 weight % or at least 0.05 weight %, and up to and including 3 weight, % or up to and including 5 weight %, based on the total weight of the aqueous composition.

Another optional but desirable component in the aqueous composition is a (e) crosslinkable polymeric material that is different from all of the (a), (b), (c), and (d) components. Useful (e) crosslinkable polymeric materials of this type include those described in [0029] and [0030] of U.S. Patent Application Publication 2011/0279554 (Dannhauser et al.), the disclosure of which is incorporated herein by reference. For example, useful (e) crosslinkable polymeric materials can include but are not limited to, gelatin, polyvinyl alcohol, polyvinyl pyrrolidone, polyvinyl amine, polyethyleneimine, starch, hydroxycellulose materials, and derivatives of such materials. Mixtures of two or more of such (e) crosslinkable polymeric materials can be used if desired. Such (e) crosslinkable polymeric materials can be readily obtained from various commercial sources or prepared using known starting materials and synthetic methods.

It may be useful to include one or more crosslinking agents in the aqueous composition to promote crosslinking of the (e) crosslinkable polymeric materials that are present. The identity and amount of crosslinking agent will depend upon the choice of (e) crosslinkable polymeric material and its reactivity with the crosslinking agent, the number of crosslinking sites available, its compatibility with other materials in the aqueous composition, and manufacturing constraints such as solution pot life and coating drying speed. Representative crosslinking agents include but are not limited to, glyoxal, CARTABOND® TSI and EPI (Clariant), SEQUAREZ™ 755 (Omnova), glutaraldehyde sodium bisulfate complex (Aldrich), Sunrez 700 M and 700C (Omnova), bis(vinyl) sulfone), bis(vinyl)sulfone methyl ether, adipoyl dihydrazide, epichlorohydrin polyamide resins, and urea-formaldehyde resin. Useful crosslinking agents can be obtained from various commercial sources.

The amount of one or more (e) crosslinkable polymeric materials in the aqueous composition according to this invention can be at least 0.1 weight % or at least 0.2 weight % and up to and including 8 weight % or up to and including 30 weight %, based on the total weight of the aqueous composition.

Yet another optional but desirable component in the aqueous composition is a (f) dispersing aid for the (c) surface-treated visible light-scattering particles, which (f) dispersing aid is cationic in cumulative charge and is different from the (a) one or more water-soluble salts of a multivalent cation but which (f) dispersing aid can be the same or different from the (b) one or more nonionic or cationic water-soluble or water-dispersible polymeric binder materials used in the aqueous composition. Thus, the (b) one or more nonionic or cationic water-soluble or water-dispersible polymeric binder materials can also serve as a (f) dispersing aid or "surface treating" material for providing the surface treatment of the (c) surface-treated visible light-scattering particles.

Useful (f) dispersing aids can be polymers having at least one protonated nitrogen atom including but not limited to, a protonated polyvinyl amine, a protonated polyethylene imine, a copolymer derived at least in part from vinyl amine, or a combination of two or more of such materials. Protonated polyvinyl amine and copolymers derived at least in part from vinyl amine are particularly useful. For example, a useful protonated polyvinyl amine is described in Col. 10 (lines 21ff) of U.S. Pat. No. 9,067,448 (noted above), the disclosure of which is incorporated herein by reference, and a commercially available example is identified as CATIOFAST® 159(A) (BASF). A protonated polyethylene imine can be a particularly useful (f) dispersing aid in some embodiments, and commercially available materials of this type are the Lupasol® line of polymers available from BASF. It will be appreciated by one skilled in the art that polyethylene images and polyvinyl amines can exist in either a protonated or unprotonated form depending upon the pH of the aqueous composition. To be useful in the present invention, the pH of the aqueous composition can be adjusted such that at least some or all of the nitrogen atoms in the noted polymers or copolymers are protonated.

The (f) dispersing aid can be present in an amount of at least 0.2 weight % or least 1 weight %, and up to and including 15 weight % or up to and including 20 weight % or even up to and including 50 weight %, based on the total weight of the (c) surface-treated visible light-scattering particles. In those embodiments in which the (f) dispersing aid is the same as the (b) one or more nonionic or cationic water-soluble or water-dispersible polymeric binder materials, the amount of the (f) dispersing aid present in the aqueous composition may be greater than the amount needed for sufficient surface treatment of the visible light-scattering particles.

The aqueous composition can further comprise one or more of the following optional materials: a surfactant, an anti-corrosion compound, a biocide, a preservative, an antifoam agent, or any combination of two or more of these materials, all of which can be readily identified by one skilled in the art and obtained from various commercial sources.

The aqueous compositions can be prepared by suitably mixing the essential (a), (b), and (c) materials along with various optional components and materials described above in a desired mixing order and with suitable equipment, in an aqueous medium that is predominantly water in amounts to provide the % solids noted above. At least 50 weight %, or at least 70 weight %, or even at least 90 weight % of the aqueous medium is comprised of water, based on the total weight of all solvents in the aqueous medium.

Representative aqueous compositions are described below in the working Examples.

Some particularly useful embodiments according to the present invention include aqueous compositions for pretreating a substrate prior to inkjet printing thereon, each aqueous composition having least 5% solids and up to and including 50% solids or up to and including 70% solids, and a dynamic viscosity of at least 30 centipoise (30 mPa-sec) and up to and including 800 centipoise (800 mPa-sec), or up to and including 1200 centipoise (1200 mPa-sec), or up to and including 2000 centipoise (2000 mPa-sec) as measured at 25° C. using a Brookfield spindle viscometer, the aqueous composition comprising the following components (a) through (f):

(a) one or more water-soluble salts of magnesium (+2), calcium (+2), barium (+2), or a mixture thereof, which (a) water-soluble salts are present in an amount of at least 1 weight % and up to and including 25 weight %, based on the total weight of the aqueous composition;

(b) one or more nonionic or cationic water-soluble or water-dispersible polymeric binder materials that comprise at least a polyvinyl alcohol, a polyvinyl amine, a polyethylene imine, a copolymer derived at least in part from a vinyl amine and vinyl alcohol, or a combination of two or more of these polymeric materials, which (b) one or more nonionic or cationic water-soluble or water-dispersible polymeric binder materials are present in an amount of at least 0.1 weight % or at least 1 weight %, and up to and including 8 weight % or up to and including 30 weight %, based on the total weight of the aqueous composition;

(c) visible light-scattering particles comprising visible light-scattering titanium dioxide particles, which have been surface-treated such that the aqueous composition has a stable zeta potential of greater than +4 millivolts (mV) or greater than +10 millivolts (mV), wherein the (c) surface-treated visible light scattering titanium dioxide particles exhibit a $D_{50}$ (median) particle size of at least 0.2 µm and up to and including 0.5 µm, as measured using a particle size analyzer that provides a volume-weighted particle size distribution, and are present in an amount of at least 5 weight % or at least 10 weight %, and up to and including 40 weight % or up to and including 60 weight %, based on the total weight of the aqueous composition;

(d) particles different from the (c) component, which (d) particles have a Rockwell Hardness of less than or equal to R75 and are present in an amount of at least 0.05 weight % and up to and including 3 weight % or up to and including 5 weight %, based on the total weight of the aqueous composition;

(e) a crosslinkable polymeric material that is different from all of the (a), (b), (c), and (d) components, and which (e) crosslinkable polymeric material is present in an amount of at least 0.1 weight % or at least 0.2 weight %, and up to and including 8 weight % or up to and including 30 weight %, based on the total weight of the aqueous composition; and (f) a dispersing aid for the (c) surface-treated visible light-scattering titanium dioxide particles, which (f) dispersing aid is a polymer having a protonated nitrogen atom, and is present in an amount of at least 0.2 weight % or at least 1 weight %, and up to and including 20 weight % or up to and including 50 weight %, based on the total weight of the (c) surface-treated visible light-scattering titanium dioxide particles.

Inkjet Receiving Media

As shown in FIG. 1, a simple embodiment according to the present invention is inkjet receiving medium 10 having substrate 100 on which topcoat composition 110 is disposed, and substrate 100 and topcoat composition 110 are contiguous or in direct contact with each other. In general, substrate 100 can be opaque, semi-transparent, translucent, or transparent, but transparent or translucent or even reflective metallized polymeric films are particularly useful with the opacity described herein that is provided by topcoat composition 110.

Suitable substrates can be typically planar in nature with two opposing surfaces or supporting sides. Substrates can have a single "layer" or stratum or be composed of multiple layers or strata composed of the same or different materials. In most instances, a substrate comprises a predominant material, such as a transparent polymeric material that is coated or layered with one or more other types of materials such as polymeric coatings or metal layers.

Useful substrate materials from which substrate 100 can be constructed include but are not limited to, glossy, semi-glossy, or matte coated lithographic offset papers that typically comprise a paper base (support) that has been coated with a clay or similar materials and has undergone surface calendering treatment to provide a desired surface smoothness. Such substrates include both glossy coated and matte coated lithographic offset papers and can be obtained from various commercial sources including for example International Paper, Sappi, NewPage, Appleton Coated, Abitibi-Bowater, Mohawk Papers, Verso, Mitsubishi, Norpac, Domtar, and others readily known to a skilled artisan.

In some embodiments, the substrate material can be readily hydrophilic and be capable of absorbing and transferring aqueous pigment-based ink colorants (such as pigment colorants) to the substrate interior prior to the topcoat composition being disposed thereon (such as being coated thereon) with the aqueous compositions described herein. For example, such a hydrophilic substrate can be porous.

Alternatively, the substrate can have a hydrophobic surface prior to the opaque topcoat composition being disposed thereon. This hydrophobic surface can be substantially impermeable to water or to an aqueous pigment-based ink composition. Thus, the topcoat composition can provide an opaque hydrophilic surface relative to the hydrophobic surface of such substrate.

Other useful substrates include coated and uncoated offset papers and other plain papers, as well as any other materials typically used as inkjet receiving media such as resin-coated papers, polyester films, microporous materials such as polyethylene-containing materials, composite films, plain coated and uncoated papers, synthetic papers, photographic paper supports, melt-extrusion-coated papers, and laminated papers such as biaxially oriented support laminates such as those described in Col. 6 (line 50) to Col. 7 (line 2) of U.S. Pat. No. 9,067,448 (noted above). Although many of the substrates mentioned herein are intrinsically opaque, the present invention is particularly useful when opaque substrates are dark in color, in which case the subsequently inkjet-printed image would be difficult to observe without first applying the white opaque aqueous composition of the present invention.

If a water-impermeable (hydrophobic) substrate such as a transparent, translucent, or metallized (coated with a metal layer) polymeric film, is used according to this invention, the surface to be coated can be modified to increase the static surface energy to greater than 45 dynes/cm (or at least 50 dynes/cm and up to and including 60 dynes/cm) prior to disposition of the topcoat composition in order to provide adequate wettability for application of the aqueous composition and formation of the topcoat composition. Surface energy modification can be carried out using corona discharge treatment (CDT), plasma discharge treatment, flame ionization treatment, atomic layer deposition, or similar treatments known in the art.

Figure 2:
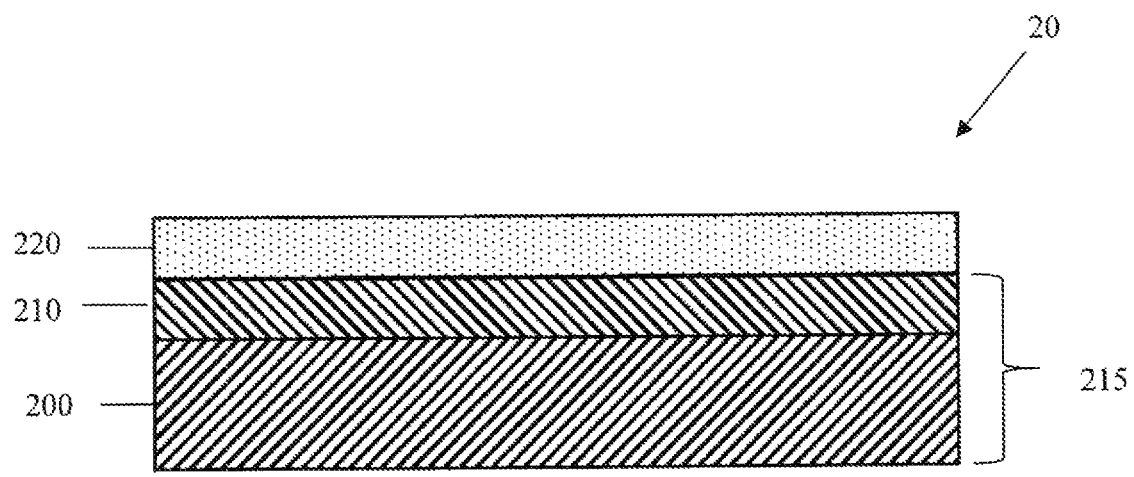
FIG. 2 shows a partial cross-sectional view of still another embodiment of an inkjet receiving medium according to the present invention comprising multiple layers.

FIG. 2 illustrates another embodiment according to this invention in which inkjet recording medium 20 comprises support 200 that can be water-impermeable and optional first layer 210 disposed on at least one surface of support 200, which together form substrate 215 for the inkjet receiving medium according to the present invention. First layer 210 can comprise a water-based tie layer composition (described below) and is located underneath topcoat composition 220. In many embodiments, support 200 can be composed of a water-impermeable material such as a transparent or translucent polymeric film, or a co-extrudate or a laminate of two more transparent or translucent polymeric films as referred to above in U.S. Pat. No. 9,067,448 (Cols. 6-7). Although the topcoat composition 220 generally provides excellent adhesion to most support 200 without the need for a separate first-layer 210, there can be supports for which first-layer 210 is useful to enhance the adhesion of topcoat composition 220 to support 200.

In some embodiments, the substrate comprises a transparent or translucent polymeric film, or a co-extrudate or a laminate of two or more transparent or translucent polymeric films. Materials of this type are readily available from various commercial sources.

First layer 210 can be known in the art as a "tie-layer" and is generally water-based meaning that it is provided from an aqueous formulation and serves to improve the adhesion of topcoat composition 220 to support 200 when it is composed of a hydrophobic material such as a transparent or translucent polymeric film (such as a polyester film) or a polyethylene coated paper. Examples of hydrophilic materials useful for composing first layer 210 (or tie-layers) include but are not limited to, halogenated phenols, partially hydrolyzed vinyl chloride-vinyl acetate copolymers, vinylidene chloride-methyl acrylate-itaconic acid terpolymers, vinylidene chloride-acrylonitrile-itaconic acid terpolymers, and glycidyl (meth)acrylate polymers. Other useful materials include any polymers, copolymers, reactive polymers and copolymers, and mixtures thereof, that exhibit effective bonding between the topcoat composition and the substrate. Water-soluble or water-dispersible polymers that can also be used include but not limited to, poly(vinyl alcohol)s, polyvinyl amine, poly(vinyl pyrrolidone), gelatin and gelatin derivatives, cellulose ethers, poly(oxazoline), poly(vinyl acetamide), partially hydrolyzed poly(vinyl acetate/polyvinyl alcohol), poly(acrylic acid), poly(acrylamide), poly(alkylene oxide)s, sulfonated or phosphonated polyesters or polystyrenes, casein, zein, albumin, chitin, chitosan, dextran, pectin, a collagen derivative, collodion, agar-agar, arrowroot, guar, carrageenan, tragacanth, xanthan, rhamsan, and various polymeric lattices. Particularly useful tie-layer materials are polyvinyl alcohols, polyvinyl amine, gelatin or a gelatin derivative, poly(ethyleneimine), an epoxy resin, polyurethanes, polyacrylamides and derivatives or copolymer thereof, and mixtures of any of these materials.

While first layer 210 can be a single discrete layer, it can also comprise two or more water-based sub-layers, each of which comprises the same or different hydrophilic materials described above. For example, first layer 210 can comprise a first sub-layer and a second sub-layer, the first sub-layer comprising poly(ethyleneimine) and an epoxy resin modified with an acidified aminoethylated vinyl polymer, and the second sub-layer that is disposed on the first sub-layer comprising a crosslinked polyvinyl alcohol.

The total dry coverage of the one or more hydrophilic materials in first layer 210 (or a tie-layer), whether comprised of a single distinct layer or multiple sub-layers, can be at least 0.05 g/m$^2$ and up to and including 12 g/m$^2$, or at least 0.05 g/m$^2$ and up to and including 8 g/m$^2$, or at least 0.05 g/m$^2$ and up to and including 3 g/m$^2$.

Further details about first layer 210 (or tie-layer) construction and materials are provided in U.S. Pat. No. 9,376,582 (Dannhauser et al.), the disclosure of which is incorporated herein by reference.

In still other embodiments of inkjet recording media according to the present invention (not illustrated), a topcoat composition can be disposed on each of the opposing surfaces of a substrate, and the individual topcoat compositions can be composed of the same or different combinations of materials, can have the same or different average dry thicknesses, or be formed using the same or different processes.

An inkjet receiving medium prepared according to the present invention can comprise a substrate that has an L* value of 50 or less, or even 40 or less.

Moreover, the inkjet receiving medium prepared according to the present invention can have an opacity of at least 30% or of at least 50%, as determined using the TAPPI 425 OP-16 opacity test describes above, and can have a colorimetry defined by an a* value of at least −5 and to and including +5 and a b* value independently of at least −5 and to and including +5, or more likely each of the a* and b* values are independently at least −3 and up to and including +3.

The topcoat composition can be disposed on the substrate surface in various ways using a number of application methods and means as described in more detailed below. For example, it can be disposed on the substrate as a continuously distributed layer, meaning that the layer is generally uniform in coating coverage and there are no intended parts of the substrate surface that are not covered. Such layers or coatings can be applied using flexography, gravure, or other known coating techniques and apparatus known in the coating arts.

Alternatively, the topcoat composition can be disposed on the substrate surface as a pattern, either as a regular (pre-determined) or irregular pattern, that can be provided using for example, flexography and suitably patterned flexographic printing sleeves or gravure and suitably engraved gravure cylinders.

For all of the inkjet recoding media embodiments according to the present invention, the topcoat composition, upon drying (that is, with less than 10 weight % or even less than 5 weight % of aqueous medium remaining), generally has a dry solids coating weight (or coating coverage) of at least 0.1 g/m$^2$ or at least 0.2 g/m$^2$ and up to and including 1 g/m$^2$, or up to and including 2 g/m$^2$, or up to and including 10 g/m$^2$.

Within the topcoat composition disposed on a surface of a substrate, the essential (a) one or more water-soluble salts of a multivalent metal cation, as described above, are generally present in an amount of at least 0.4 weight % or at least 15 weight % and up to and including 40 weight %, based on the total weight of the topcoat composition. In general, the useful coverage of the topcoat composition will provide, at least 1.2 weight % and up to and including 40 weight % of the multivalent metal cation, based on the total weight of the topcoat composition.

For example, the (a) one or more water-soluble salts of a multivalent metal cation can be present in an amount sufficient to provide the multivalent cation (such as calcium cation) in the topcoat composition in an amount of at least 0.01 g/m$^2$ and up to and including 4 g/m$^2$.

In addition, the essential (b) one or more nonionic or cationic water-soluble or water-dispersible polymeric binder materials, as described above, can be present in the topcoat composition in an amount of at least 0.5 weight % or at least 2 weight %, and up to and including 30 weight % or up to and including 90 weight %, based on the total weight of the topcoat composition.

The essential (c) surface-treated visible light-scattering particles as described above are present in the topcoat composition in an amount of at least 6 weight %, and up to and including 50 weight % or up to and including 90 weight %, based on the total weight of the topcoat composition. Particularly useful (c) surface-treated visible light-scattering particles comprising surface-treated visible light-scattering titanium dioxide particles, such as aluminum oxide-treated visible light-scattering titanium dioxide particles.

The (d) particles different from the essential (c) component as described above having a Rockwell Hardness of less than or equal to R90 (or D75) can be present in the topcoat composition in an amount of at least 0.06 weight % or at least 0.5 weight % and up to and including 5 weight %, or up to and including 10 weight %, based on the total weight of the topcoat composition. In some embodiments, the (d) particles can have an ESD that is at least 0.1 μm greater than sum of the dry thickness of the topcoat composition and the dry thickness of any inkjet-printed image or layer.

In addition, the (e) crosslinkable polymeric material(s) as described above that is also different from all of the (a), (b), (c) and (d) components can be present in the topcoat composition in an amount of at least 0.1 weight % and up to and including 20 weight % or up to and including 30 weight %, based on the total weight of the topcoat composition. A crosslinking agent, as described above, can be present also, and the useful amount of such (e) crosslinking agent would be readily apparent to one skilled in the art using routine experimentation.

Further, as described above, the (f) dispersing aid for the (c) surface-treated visible light-scattering particles, as described above, is cationic in cumulative charge. In general, the (f) dispersing aid is different from the (a) one or more water-soluble salts of a multivalent metal cation and can be the same as or different from (b) one or more nonionic or cationic water-soluble or water-dispersible polymeric binder materials. Such (f) dispersing aids can be present in the topcoat composition in an amount of at least 0.2 weight % and up to and including 50 weight %, based on the total weight of the (c) surface-treated visible light-scattering particles. For example, a useful (f) dispersing aid can be a polymer having a protonated nitrogen atom such as a protonated polyvinyl amine or a protonated polyethylene imine, or a copolymer derived at least in part form a vinyl amine and vinyl alcohol, that can be present in an amount of at least 0.2 weight % and up to and including 50 weight %, based on the total weight of the surface-treated visible light-scattering particles that can be surface-treated visible light-scattering titanium dioxide particles. For example, such (f) dispersing aids can be used when the (b) one or more nonionic or cationic water-soluble or water-dispersible polymeric binder materials comprise at least a polyvinyl amine, a polyvinyl alcohol, a protonated polyethylene imine, a protonated polyvinyl amine, or a copolymer derived at least in part from vinyl amine.

The topcoat composition can also comprise one or more of the optional addenda described above, such as a surfactant, an anti-corrosion compound, a biocide, a preservative, or an antifoam agent.

The resulting inkjet recording medium can be used for various purposes, but it is particularly useful for inkjet printing methods to provide a monochrome or multi-chrome (or multicolor) image or layer in an inkjet-printed article. Such inkjet-printed articles then can have a substrate and topcoat composition for example as illustrated in each of FIGS. 1 and 2, on which an aqueous-based inkjet printing image or layer is disposed over (for example, directly on) the topcoat composition.

As described in more detail below, an inkjet-printed image or layer can be formed by inkjet printing one or more aqueous-based inkjet ink compositions that are described below.

Method for Making Inkjet Receiving Media

An aqueous composition (also identified herein as a "topcoat composition formulation") according to this invention can be used to prepare or form a topcoat composition of the desired opacity on only one or both opposing sides (or surfaces) of a substrate (as described above). Thus, a substrate is chosen and an aqueous composition according to this invention is formulated and disposed on at least one surface of the substrate and dried to provide a topcoat composition. The result of these operations is an inkjet receiving medium according to the present invention useful for inkjet printing according to this invention.

The procedures and apparatus used to accomplish these operations can be selected from various known techniques and apparatus, including but not limited to spraying, rod coating, blade coating, gravure coating, (direct, reverse, or offset), flexographic coating, size press (puddle and metered), extrusion hopper coating, and curtain coating, using suitable equipment for these purposes.

In some embodiments, a topcoat composition can be disposed on a substrate surface in-line as part of substrate manufacturing (such as a paper making process or a film-forming process). Alternatively, the topcoat composition can be disposed on a substrate surface in a separate step after the manufacture of the substrate. Moreover, the topcoat composition can be formed in-line as part of an inkjet printing operation, wherein the aqueous composition is disposed on a substrate surface in a "pre-coating" or "pre-treatment" station prior to printing of aqueous pigment-based inks using a multi-station apparatus. Such pre-coating operations can be designed to provide uniform (continuous) coverage of the topcoat composition, or in some instances, only a specific area of the substrate can be provided with the aqueous composition to form a pattern or image. While the disposed topcoat composition can be dried completely before inkjet image printing, complete drying may not be necessary and overall drying of both disposed topcoat composition and inkjet-printed image or layer can be carried out at the same time. The topcoat composition can be disposed on the substrate surface in a manner to provide a continuously distributed layer. For example, various application techniques such as gravure coating or flexographic printing can be used to dispose the aqueous composition in a pattern followed by inkjet printing in registration with that pattern.

If an inkjet-printed medium is prepared with a first layer (tie-layer) or multiple sub-layers for the substrate, as described above, such first layer can be formed using techniques and equipment described above for the topcoat composition. For example, the first layer and topcoat composition can be separately disposed or formed on the substrate in distinct or separate coating operations with an intermediate drying operation. Alternatively, the first layer can be formed in-line as part of an inkjet receiving media manufacturing or an inkjet printing operation so that multiple layers are formed or applied sequentially with or without drying between layer applications using a multi-station apparatus. Further details of such processes are provided in Cols. 7-8 of U.S. Pat. No. 9,376,582 (noted above). The formation of multiple layers in inkjet receiving media is also possible using slide-hopper and curtain coating techniques. Useful dry coating coverages for first layer (tie-layers) are described above.

Method and Apparatus for Inkjet Printing

Inkjet receiving media according to the present invention can be inkjet printed with one or more aqueous pigment-based inks comprising one or more pigment colorants to provide a pigment-based image or layer. These aqueous pigment-based inks can be printed onto the topcoat composition of the inkjet receiving media designed and prepared as described above. The inkjet printing methods according to the present invention can be used for printing periodicals, newspapers, magazines, greeting cards, lottery tickets, plastic wrap, paperboard, advertising, flexible packaging, labels, and other materials that would be readily apparent to one skilled in the art.

While the aqueous compositions according to this invention can be useful in inkjet receiving media useful in one or more drop-on-demand (DOD) printing systems, the advantages of the present invention are particularly evident when the method according to the present invention is carried out using continuous inkjet (CIJ) printing processes and equipment at high printing speeds. There are several CIJ printing processes known in the art, and the present invention is not limited to a particular CIJ process, but there may be certain CIJ processes that are more useful than others. In general, such CIJ processes use one or more aqueous pigment-based inks that are ejected through one or more printheads (containing nozzles) and unprinted aqueous pigment-based ink is collected and recycled through the printing system multiple times until it is used up. In addition, the CIJ printing system can have incorporated replenisher systems. Details of such CIJ processes and equipment are provided for example in U.S. Pat. No. 8,173,215 (Sowinski et al.), the disclosure of which is incorporated herein by reference.

Thus, in most CIJ inkjet printing processes, each aqueous pigment-based ink can be ejected or printed from a main fluid supply dedicated to it only, as a continuous stream of the aqueous pigment-based ink that is broken into both printing drops and non-printing drops. The non-printing drops of each aqueous pigment-based ink can be collected using suitable collecting means such as a "catcher" and returned to its respective main fluid supply. This entire scenario can be carried out using a single (first) aqueous pigment-based ink alone, or in combination with one or more "additional" aqueous pigment-based inks having the same or different "colors" or hues as the first aqueous pigment-based ink. The multiple aqueous pigment-based inks are then inkjet printed in a chosen sequence that can be controlled by software and digital input, in a controlled manner, to provide a multicolor inkjet-printed image on the surface of the inkjet receiving medium.

Each of the one or more aqueous pigment-based inks can be supplied from respective main fluid supplies as one or more continuous streams, and each of these one or more continuous streams can be broken into both printing drops and non-printing drops that are collected and returned from the each of the one or more continuous streams to the respective main fluid supplies.

In addition, inkjet printing of an aqueous "colorless" or aqueous pigment-free ink composition or fluid can be carried out in place of, simultaneously with, or sequentially with inkjet printing of a colored aqueous pigment-based ink(s). For example, according to U.S. Patent Application Publication 2018/0051184 (Lussier et al.), the disclosure of which is incorporated herein by reference, a colorless lacquer or colorless ink composition can be applied over a single- or multi-color pigment-based image or layer. The inkjet receiving media according to the present invention can be used in such printing processes.

Printer replenishment systems for maintaining quality of an aqueous pigment-based ink and to counter the effects of volatile component evaporation and that measure ink electrical resistivity are described for example in U.S. Pat. No. 5,526,026 (Bowers), the disclosure of which is incorporated herein by reference and in EP 0597628B1 (Loyd et al.). Useful CU printing processes and equipment that employ other means for aqueous pigment-based ink concentration sensing are disclosed in U.S. Pat. No. 7,221,440 (McCann et al.), the disclosure of which is incorporated herein by reference, and in EP 0 571,784B1 (McCann et al.) and EP 1,013,450B1 (Woolard et al.).

In one embodiment, basic replenishment is carried out as follows: a fluid system contains an ink resistivity measurement cell through which an aqueous pigment-based ink passes as it is being recirculated through the ink handling portion of the system, including the printhead. A calculation means determines the resistance of the ink resistivity cell. A logic and control unit, responsive to the calculation means, controls the transfer of aqueous pigment-based ink from a supplemental "ink" supply and the transfer of an aqueous particle-free fluid ("carrier fluid") from a replenishment carrier fluid supply to the system main fluid supply, to maintain desired resistivity in the aqueous inkjet ink composition. The volume of the aqueous pigment-based ink is monitored by a float valve position, and when a predetermined volume has been depleted, the predetermined volume is replaced by either aqueous pigment-based ink from the supplemental "ink" supply or by carrier fluid from the replenishment carrier fluid supply. Thus, the first and any additional aqueous pigment-based inks can be replenished, respectively, with first and any additional aqueous pigment-based inks.

In other examples, the method according to the present invention can further comprise replenishing a main fluid supply with an aqueous particle-free fluid that has a dynamic viscosity of less than or equal to 5 centipoise (5 mPa-sec) at 25° C. as measured using a rolling ball viscometer.

In some embodiments, the method according to the present invention is carried out using a plurality of printing drops formed from a continuous fluid stream, and non-printing drops of a different volume than the printing drops are diverted by a drop deflection means into a "catcher" for collection and recirculation. Details about such CIJ printing systems and equipment are provided for example in U.S. Pat. No. 6,588,888 (Jeanmaire et al.), U.S. Pat. No. 6,554,410 (Jeanmaire et al.), U.S. Pat. No. 6,682,182 (Jeanmaire et al.), U.S. Pat. No. 6,793,328 (Jeanmaire et al.), U.S. Pat. No. 6,866,370 (Jeanmaire et al.), U.S. Pat. No. 6,575,566 (Jeanmaire et al.), and U.S. Pat. No. 6,517,197 (Hawkins et al.), and in U.S. Patent Application Publication 2002/0202054 (Jeanmaire et al.), the disclosures of all of which are incorporated herein by reference.

In other embodiments, an aqueous pigment-based ink can be printed using an apparatus capable of controlling the direction of the formed printing drops and non-printing drops by asymmetric application of heat to the fluid stream that initializes drop breakup and serves to steer the resultant drop as described for example in U.S. Pat. No. 6,079,821 (Chwalek et al.) and U.S. Pat. No. 6,505,921 (Chwalek), the disclosures of both of which are incorporated herein by reference. Useful agitation, heated supply, printhead, and fluid filtration means for CIJ printing are described for example in U.S. Pat. No. 6,817,705 (Crockett et al.), the disclosure of which is incorporated herein by reference.

A simple schematic of a CIJ printing system is provided in FIG. 1 of U.S. Pat. No. 8,764,161 (Cook et al), the disclosure of which is incorporated herein by reference.. Other useful details concerning CIJ printing apparatus and printhead fabrication are described for example in U.S. Pat. No. 6,943,037 (Anagnostopoulos et al.), 6,554,410 (Jeanmaire et al.), 6,682,182 (Jeanmaire et al.), 6,793,328 (Jeanmaire), 6,517,197 (Hawkins et al.), 6,866,370 (Jeanmaire), and 6,575,566 (Jeanmaire et al.), U.S. Patent Application Publication 2003/0202054 (Jeanmaire et al.), the disclosures of all of which are incorporated herein by reference.

Thus, the printing methods according to the present invention can be carried out using a continuous high-speed commercial inkjet printer, for example in which the inkjet printer applies colored images using one or more different print heads such as full-width print heads with respect to the inkjet receiving media, in sequence, in which the different colored parts of images are to be registered.

One type of continuous inkjet (CIJ) printing uses a pressurized ink source that produces a continuous stream of printing drops (droplets) from a main fluid supply for each aqueous pigment-based ink, or a continuous stream that is broken into both printing drops and non-printing drops. Continuous inkjet printers can utilize electrostatic charging devices that are placed close to the point where a filament of working inkjet composition breaks into individual drops that are electrically charged and then directed to an appropriate location by deflection electrodes having a large potential difference. Where no color image is desired, the non-printing drops can be deflected into an ink-capturing mechanism and disposed of or recycled by returning them to the original main fluid supply. When a printed color image is desired, the printing drops are not deflected but are allowed to strike the topcoat composition of the inkjet receiver medium in designated locations. Alternatively, deflected printing droplets can be allowed to strike the topcoat composition of the inkjet receiver medium while non-deflected non-printing drops can be collected and returned to the main fluid supply.

In some embodiments, the method according to the present invention can comprise printing one or more aqueous pigment-based inks onto the topcoat composition of an inkjet receiving medium to provide a pigment-based image in a predetermined pattern using an inkjet deposition system in response to electrical signals, and this predetermined pattern can be inkjet-printed in registration with the same pattern provided by the topcoat composition.

Thus, printing one or more aqueous pigment-based inks onto the topcoat composition that is disposed on the substrate surface as a pattern, can be accomplished in a manner to provide a pigment-based image in registration with the pattern of the topcoat composition using a suitable inkjet deposition system.

For example, the topcoat composition can be disposed on the substrate surface in a pattern using flexographic printing, and the B) inkjet printing of one or more aqueous pigment-based inks can be carried out in-line at different stations of a multi-station apparatus onto the pattern of the topcoat composition to provides a pigment-based image in registration with the pattern of the topcoat composition.

In such embodiments, the substrate can comprise a hydrophobic surface prior to the topcoat composition being formed thereon, which hydrophobic surface is impermeable to water or to an aqueous ink composition, and in which the topcoat composition provides a hydrophilic surface relative to the hydrophobic surface of the substrate.

Such substrates can comprise a transparent, translucent, or metallized polymeric film, or a co-extrudate or a laminate of two or more transparent, translucent, or metalized polymeric films.

An aqueous pigment-based ink useful according to the present invention can be prepared from a suitable aqueous dispersion of one or more particulate pigments using known dispersants and dispersing means. The resulting aqueous pigment-based ink can be mixed with one or more humectants or co-solvents and the components can be formulated in an aqueous medium (predominantly water) to provide an aqueous pigment based inkjet ink having a dynamic viscosity of less than or equal to 10 centipoise (10 mPa-sec), or less than or equal to 5 centipoise (3 mPa-sec), or even less than or equal to 3 centipoise (1.5 mPa-sec), all measured at 25° C. as described above.

Each aqueous pigment-based ink useful in the practice of this invention typically comprises one or more particulate, organic or inorganic pigment colorants that will provide the desired color or hue such as black, green, red, yellow, blue, violet, magenta, cyan, white, brown, grey and other hues known in the art. Pigment colorants can be present individually or in mixtures in each aqueous pigment-based ink. For example, aqueous pigment-based inks useful in the present invention comprise one or more pigment colorants selected from a cyan pigment, a magenta pigment, a yellow pigment, a black pigment, a green pigment, an orange pigment, a white pigment, a red pigment, a blue pigment, a violet pigment, and a combination of any of these pigment colorants, and desirably, each and all of these pigments are anionically-stabilized as described below.

A wide variety of organic and inorganic pigment colorants can be used individually or in combination. For example, a carbon black pigment can be combined with a colored pigment such as a cyan copper phthalocyanine or a magenta quinacridone pigment. Useful pigments are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

In general, useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific useful pigment colorants are described in Col. 10 (lines 66) to Col. 11 (line 40) of U.S. Pat. No. 8,455,570 (Lindstrom et al.), the disclosure of which is incorporated herein by reference. Mixtures of pigments can be used to provide a desired hue or color, as described for example in U.S. Pat. No. 9,605,169 (Lussier et al.), the disclosure of which is incorporated herein by reference.

Useful pigment colorants can be accompanied by suitable polymeric or non-polymeric dispersants that are well known in the art (as described above), or the pigment colorants can be self-dispersing and thus dispersible and stable in the aqueous pigment-based ink without the use of dispersants because of the presence of appropriate surface groups. Examples of useful self-dispersing pigment colorants are described in Col. 11 (lines 49-53) of U.S. Pat. No. 8,455,570 (noted above).

It is particularly useful that the pigment colorants used in the present invention in the aqueous pigment-based inks, are stabilized with anionic moieties (that is, "anionically-stabilized pigments"). Such pigment colorants can be purchased from various commercial sources, and a skilled worker would know which pigment colorants of this type could be used in the present invention. For example, some of such pigment colorants are self-dispersing pigments that are dispersible and stable without the use of a polymeric or molecular dispersant or surfactant. Pigment colorants of this type are generally those that have been subjected to a surface treatment such as oxidation/reduction, acid/base treatment, or functionalization through coupling chemistry. The surface treatment can functionalize the surface of the pigment colorant with anionic groups.

Useful pigment colorants can have a median particle diameter of less than 150 nm and more likely less than 100 nm or even less than 50 nm. As used herein, the term "median particle diameter" refers to the $D_{50}$ of the classified particle size distribution such that 50% of the volume of the pigment colorant particles is provided by particles having diameters smaller than the indicated diameter. A laser light-scattering device, as described above, can be used to measure the particle size distributions.

Organic or inorganic pigment colorants can be present in each aqueous pigment-based ink in an amount of at least 0.1 weight % and up to and including 30 weight %, or more likely of at least 1 weight % and up to and including 10 weight %, or even at least 1 weight % and up to and including 8 weight %, based on the total weight of the aqueous pigment-based ink.

Each aqueous pigment-based ink generally comprises one or more humectants that are generally water soluble or water miscible organic solvents having a viscosity that is greater than 40 centipoise (0.040 mPa-sec) or even at least 100 centipoise (0.1 mPa-sec) when measured at 25° C. For example, any water-soluble humectant known in the inkjet art that is compatible with the other requirements of the invention can be used. While an individual humectant can be employed, mixtures of two or more humectants, each of which imparts a useful property, can be used. Representative humectants are described for example, in U.S. Pat. No. 9,783,553 (Lussier et al.), the disclosure of which is incorporated herein by reference.

The one or more humectants, such as triethylene glycol, can be present in an amount of at least 0.5 weight %, or at least 1 weight % and up to and including 10 weight %, or at least 3 weight % and up to and including 7 weight %, all based on the total weight of the aqueous pigment-based ink.

Each aqueous pigment-based ink useful according to the present invention can further comprise one or more anionic polyurethanes, each having an acid number of at least 50, or of at least 60 and up to and including 150, or even at least 55 and up to and including 90, which materials are described in more detail below.

Alternatively, or in addition to the anionic polyurethanes, the aqueous pigment-based ink can comprise one or more anionic (meth)acrylic or anionic styrene-(meth)acrylic polymers, each having an acid number of at least 50, or of at least 120 and up to and including 240, or even at least 160 and up to and including 220, which polymers are described in more detail below. The term (meth)acrylic refers to both acrylic materials and methacrylic materials.

Representative examples of both types of polymers are described for example in U.S. Pat. No. 8,430,492 (Falkner et al.) and U.S. Pat. No. 9,783,553 (noted above). Particularly useful anionic polyurethanes contain a polyether diol unit and can be identified as polyether polyurethanes. Such anionic polyether polyurethanes generally can have a molecular weight (Mw) of at least 10,000 Daltons and up to and including 30,000 Daltons or at least 15,000 Daltons and up to and including 25,000 Daltons. For example, particularly useful polyether polyurethanes are individually represented by Structure (I) in U.S. Pat. No. 9,783,553 (noted above).

Useful water-soluble or water-dispersible anionic polyether polyurethanes can be prepared as described for example in [0045]-[0049] of U.S. Patent Application Publication 2008/0207811 (Brust et al.), the disclosure of which is incorporated herein by reference. The acidic groups in the anionic polyether polyurethanes can be at least partially and up to 100% neutralized (converted into salts) using monovalent inorganic bases such as alkaline metal hydroxides or organic amines such as dimethylethanolamine.

Representative anionic (meth)acrylic polymers and anionic styrene-(meth)acrylic polymers useful in the present invention are described for example in [0061] of U.S. Patent Application Publication 2008/207811 (noted above). Examples of useful anionic styrene-acrylic polymers include those commercially available under the trademarks JON-CRYL® (S.C. Johnson Co.), TRUDOT® (Mead Westvaco Co.), and VANCRYL® (Air Products and Chemicals, Co.).

In addition, modified polysiloxanes can be present in the aqueous pigment-based ink(s). Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. Non-silicone surfactants can also be used, including but not limited to anionic, cationic, nonionic, or amphoteric surfactants such as those commercially available as SURFYNOL® surfactants (Air Products) including SURFYNOL® 440 and 465 alkynediol surfactants.

Colorless fluorescent colorants (dyes or pigments) can also be present in the aqueous pigment-based ink and examples of such compounds are described in U.S. Patent Application Publication 2014/231674 (Cook), the disclosure of which is incorporated herein by reference.

Other additives that can be present in the aqueous pigment-based inks, in amounts that would be readily apparent to one skilled in the art, include but are not limited to, co-solvents, thickeners, conductivity-enhancing agents, drying agents, waterfast agents, viscosity modifiers, pH buffers, preservatives, antifoamants, wetting agents, corrosion inhibitors, biocides, fungicides, defoamers (such as SURFYNOL® DF110L, PC, MD-20, and DF-70), UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (noted above).

Water is generally present in each aqueous pigment-based ink in an amount of at least 75 weight % or at least 80 weight %, and generally at no more than 90 weight %, based on the total weight of the aqueous pigment-based ink.

The pH of each aqueous pigment-based ink can be adjusted if desired to at least 8 and up to and including 12, or more likely of at least 8 and up to and including 10, or in some embodiments of at least 8 and up to and including 9.5. The pH can be achieved using any suitable base such as a hydroxide or an organic amine in a suitable amount. Buffers can be included to maintain the desired pH as would be readily apparent to one skilled in the art, according to Cols. 17-19 of U.S. Pat. No. 8,455,570 (noted above).

The various aqueous pigment-based inks useful according to the present invention can be supplied individually or as components of ink sets that can be designed for use in the same inkjet printing apparatus.

Inkjet Printed Articles

Inkjet-printed articles prepared according to the present invention comprise a substrate (as described above) on which a topcoat composition has been disposed (as described above), and on which at least one aqueous-based inkjet-printed image or layer has been disposed by inkjet printing. As noted above, such inkjet-printed image or layer can be monochrome (single color) or multi-color, or even colorless, or a colorless image or layer can be formed over a monochrome or multi-color inkjet-printed image.

Figure 3:
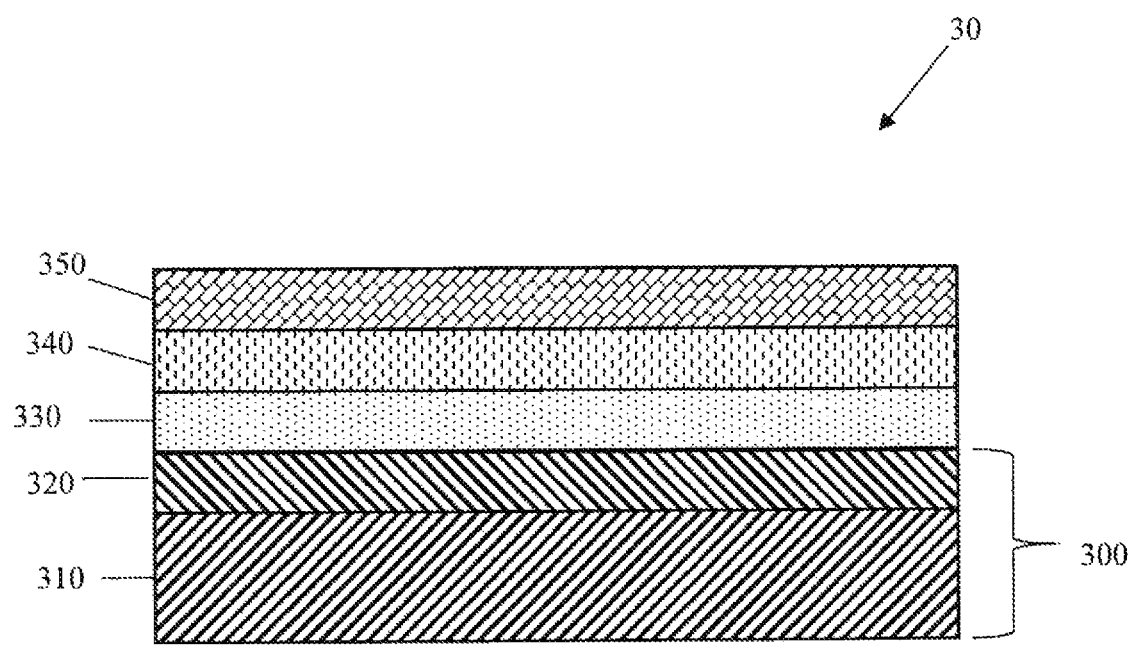
FIG. 3 shows a partial cross-sectional view of an inkjet-printed article according to the present invention.

In some embodiments (for example, as illustrated in FIG. 3), inkjet-printed article 30 can comprise substrate 300 that is composed of water-impermeable support 310 and optional first layer 320 disposed thereon (which can have a water-based tie-layer composition); topcoat composition 330 disposed on first layer 320; aqueous-based inkjet-printed image or layer 340 disposed on topcoat composition 330, and post-print functional layer 350 disposed on aqueous-based inkjet-printed image or layer 340, which post-print functional layer 350 can be a transparent protective layer or an adhesive layer that optionally can have a protective layer adhered thereto. In the case of a lottery ticket use, post-print functional layer 350 can be a removable scratch-off layer.

Some methods of the present invention can include, after B) inkjet printing one or more aqueous pigment-based inks on the topcoat composition:

C) applying an aqueous colorless ink composition as are known in the art, to the pigment-based image or layer.

The resulting inkjet-printed article according to this invention can have a topcoat composition disposed as a pattern or layer on the substrate surface, and a pigment-based inkjet-printed pattern (or image) that can be arranged in registration with the pattern or layer of the topcoat composition. In addition, an aqueous-based colorless ink composition can be disposed as a pattern in registration with the pigment-based inkjet-printed pattern or image in this particular inkjet-printed article.

A transparent protective layer can be used as a post-print functional layer to protect the inkjet-printed article against environmental and physical damage and stress, provide abrasion resistance, resistance to fingerprints, and delamination resistance. Such transparent protective layers can be provided as described in U.S. Patent Application Publication 2018/0051184 (noted above), the disclosure of which is incorporated herein by reference. In addition, known aqueous-based overprint varnishes such as Haut Brilliant 17-604327-7 (Siegwerk) and Micheal Huber Munchen 877801 Varnish Anticurling can be applied as a transparent post-print functional layer.

An adhesive layer can be present as a post-print functional layer to provide adhesion especially in applications such as flexible laminated packaging wherein it is desired to bond a separate film or paper layer to a treated, coated, or printed layer. Useful examples of aqueous-based adhesives useful for such adhesive layers include but are not limited to, Dow Chemical ROBOND™ acrylic adhesives L90M, L0148, and L330 that can be used in combination with a crosslinking agent such as Dow Chemical CR 9-101. Another option is the Dow Chemical AQUALAM™ polyurethane aqueous-based adhesive used in combination with the Dow Chemical CR 7-103 crosslinking agent.

Referring to FIG. 3, when post-print functional layer 350 is present and is aqueous-based, it can be applied or formed using any of the methods described above for applying or forming first layer 320 and topcoat composition 330, including known coating and digital deposition processes. For example, post-print functional layer 350 can be applied as a flood coating across the entire surface of the treated, coated, and inkjet-printed article, or it can be applied in a pattern-wise or image-wise fashion. If post-print functional layer 350 is solvent-free, it can be applied using a melt extrusion process wherein the molten or viscous solventless composition is extruded as a continuous layer over the surface of the dried aqueous-based inkjet-printed image or layer 340. Following extrusion, post-print functional layer 350 can be further processed using heat and pressure to improve adhesion, followed by cooling. In some embodiments, a solventless composition can be a two-part reactive composition intended to serve as an adhesive to which a continuous protective post-print functional layer is laminated using heat or pressure.

In some other embodiments, the inkjet-printed article according to the present invention is simpler in structure (not shown) compared to that illustrated in FIG. 3. In such embodiments, an aqueous-based inkjet-printed image or layer like 340 is disposed directly on a topcoat composition. Thus, first layer 320 is omitted. Post-print functional layer 350 can be present or omitted from such embodiments.

Other useful embodiments of inkjet receiving media and resulting inkjet-printed articles can be conceived of by a skilled artisan using the present teaching.

The present invention provides at least the following embodiments and combinations thereof, but other combinations of features are considered to be within the present invention as a skilled artisan would appreciate from the teaching of this disclosure:

1. An aqueous composition for pre-treating a substrate prior to inkjet printing thereon, the aqueous composition having at least 2% solids and up to and including 90% solids, and the aqueous composition comprises the following (a), (b), and (c) components:

(a) one or more water-soluble salts of a multivalent metal cation, which (a) one or more water-soluble salts are present in an amount of at least 0.5 weight % and up to and including 30 weight %;

(b) one or more nonionic or cationic water-soluble or water-dispersible polymeric binder materials are present in an amount of at least 0.1 weight % and up to and including 30 weight %; and (c) visible light-scattering particles that have been surface-treated such that the aqueous composition has a stable zeta potential of greater than +4 millivolts, and which (c) surface-treated visible light-scattering particles are present in an amount of at least 5 weight % and up to and including 60 weight %, wherein the amounts of the (a), (b), and (c) components are based on the total weight of the aqueous composition.

2. The aqueous composition of embodiment 1, wherein the (c) surface-treated visible light-scattering particles exhibit a $D_{50}$ (median) particle size of at least 0.04 μm and up to and including 2 μm, as measured by a particle analyzer providing a volume-weighted particle size distribution.

3. The aqueous composition of embodiment 1 or 2, wherein the (c) surface-treated visible light-scattering particles exhibit a $D_{50}$ (median) particle size of at least 0.04 μm and up to and including 0.5 μm, as measured by a particle analyzer providing a volume-weighted particle size distribution.

4. The aqueous composition of any of embodiments 1 to 3, further comprising:

(d) particles different from the (c) component, which (d) particles have a Rockwell Hardness of less than or equal to R90 and are present in an amount of at least 0.02 weight % and up to and including 5 weight %, based on the total weight of the aqueous composition.

5. The aqueous composition of any of embodiments 1 to 4, further comprising:

(e) crosslinkable polymeric material that is different from all of the (a), (b), (c), and (d) components, and which (e) crosslinkable polymeric material is present in an amount of at least 0.1 weight % and up to and including 30 weight %, based on the total weight of the aqueous composition.

6. The aqueous composition of any of embodiments 1 to 5, further comprising:

(f) a dispersing aid for the (c) surface-treated visible light-scattering particles, which (f) dispersing aid is cationic in cumulative charge and is present in an amount of at least 0.2 weight % and up to and including 50 weight %, based on the total weight of the (c) surface-treated visible light-scattering particles.

7. The aqueous composition of embodiment 6, wherein the (0 dispersing aid is a polymer having at least one protonated nitrogen atom, and is present in the aqueous composition in an amount of at least 1 weight % and up to and including 20 weight %, based on the total weight of the (c) surface-treated visible light-scattering particles.

8. The aqueous composition of any of embodiments 1 to 7, wherein the (b) one or more nonionic or cationic water-soluble or water-dispersible polymeric binder materials comprise one or more of a polyvinyl alcohol, polyethylene imine, polyethylene oxide, polyvinyl amine, a copolymer derived at least in part from vinyl alcohol and ethylene oxide, a copolymer derived at least in part from a vinyl amine and vinyl alcohol, or a combination of two or more of these polymeric materials.

9. The aqueous composition of any of embodiments 1 to 8, wherein the (b) one or more nonionic or cationic water-soluble or water-dispersible polymeric binder materials comprise at least a polyvinyl amine, polyethylene imine, a polyvinyl alcohol, a copolymer derived at least in part from vinyl amine and vinyl alcohol, or a combination of two or more of these polymeric materials.

10. The aqueous composition of any of embodiments 7 to 9, wherein the (b) one or more nonionic or cationic water-soluble or water-dispersible polymeric binder materials is the same as the (f) dispersing aid.

11. The aqueous composition of any of embodiments 1 to 10, having a dynamic viscosity of less than 2000 centipoise (2000 mPa-sec) at 25° C. as measured using a Brookfield spindle viscometer.

12. The aqueous composition of any of embodiments 1 to 11, having a dynamic viscosity of at least 30 centipoise (30 mPa-sec) and up to and including 800 centipoise (800 mPa-sec) as measured at 25° C. using a Brookfield spindle viscometer.

13. The aqueous composition of any of embodiments 1 to 12, wherein the (a) one or more water-soluble salts of a multivalent metal cation are one or more water-soluble salts of magnesium (+2), calcium (+2), barium (+2), zinc (+2), and aluminum (+3).

14. The aqueous composition of any of embodiment 1 to 13, further comprising one or more of each of the following materials: a surfactant, an anti-corrosion compound, a biocide, a preservative, an antifoam agent, or a combination of two or more of these materials.

15. The aqueous composition of any of embodiments 1 to 14, wherein the (c) surface-treated visible light-scattering particles comprise silicon dioxide, zinc oxide, titanium dioxide, zirconium oxide, aluminum oxide, barium sulfate, magnesium oxide, or a combination of two or more of these materials.

16. The aqueous composition of any of embodiments 1 to 15, wherein the (c) surface-treated visible light-scattering particles comprise surface-treated visible light-scattering titanium dioxide particles.

17. The aqueous composition of any of embodiments 1 to 16, comprising an aqueous medium composed of at least 50 weight % water, based on the total weight of all solvents in the aqueous medium.

18. A aqueous composition providing one or more embodiments of the present invention for pre-treating a substrate prior to inkjet printing thereon, the aqueous composition having at least 5% solids and up to and including 70% solids, and a dynamic viscosity of at least 30 centipoise (30 mPa-sec) and up to and including 800 centipoise (800 mPa-sec) as measured at 25° C. using a Brookfield spindle viscometer, and the aqueous composition comprises the following (a), (b), (c), (d), (e), and (f) components:

(a) one or more water-soluble salts of magnesium (+2), calcium (+2), barium (+2), or a mixture thereof, which (a) one or more water-soluble salts are present in an amount of at least 1 weight % and up to and including 25 weight %, based on the total weight of the aqueous composition;

(b) one or more nonionic or cationic water-soluble or water-dispersible polymeric binder materials that comprise at least a polyvinyl alcohol, a polyvinyl amine, a polyethylene imine, a copolymer derived at least in part from a vinyl amine and vinyl alcohol, or a combination of two or more of these polymeric materials, which (b) one or more nonionic or cationic water-soluble or water-dispersible polymeric binder materials are present in an amount of at least 0.1 weight % and up to and including 30 weight %, based on the total weight of the aqueous composition;

(c) visible light-scattering particles comprising visible light scattering titanium dioxide particles, that have been surface-treated such that the aqueous composition has a stable zeta potential of greater than +10 millivolts, wherein the surface-treated visible light-scattering titanium dioxide particles exhibit a $D_{50}$ (median) particle size of at least 0.04 µm and up to and including 2 µm, as measured using a particle size analyzer that provides a volume-weighted particle size distribution, and which surface-treated visible light-scattering particles are present in an amount of at least 10 weight % and up to and including 40 weight %, based on the total weight of the aqueous composition;

(d) particles different from the (c) component, which (d) particles have a Rockwell Hardness of less than or equal to R75 and are present in an amount of at least 0.05 weight % and up to and including 3 weight %, based on the total weight of the aqueous composition;

(e) a crosslinkable polymeric material that is different from all of the (a), (b), (c), and (d) components, and which (e) crosslinkable polymeric material is present in an amount of at least 0.2 weight % and up to and including 8 weight %, based on the total weight of the aqueous composition; and (f) a dispersing aid for the (c) surface-treated visible light-scattering titanium dioxide particles, which (f) dispersing aid is a polymer having a protonated nitrogen atom, and is present in an amount of at least 0.2 weight % and up to and including 50 weight %, based on the total weight of the (c) surface-treated visible light-scattering titanium dioxide particles.

19. The aqueous composition of embodiment 18, wherein the (f) dispersing aid is at least a protonated polyethylene imine or protonated polyvinyl amine.

20. The aqueous composition of embodiment 18 or 19, wherein the (c) surface-treated visible light-scattering particles comprise surface-treated visible light-scattering titanium dioxide particles.

21. The aqueous composition of any of embodiments 18 to 20, comprising an aqueous medium composed of at least 50 weight % water, based on the total weight of all solvents in the aqueous medium.

22. An inkjet receiving medium comprising a substrate and a topcoat composition disposed on a surface thereof, which topcoat composition is derived from the aqueous composition of any of embodiments 1 to 21, and comprises the following (a), (b), and (c) components:

(a) one or more water-soluble salts of a multivalent metal cation, which (a) one or more water-soluble salts are present in an amount of at least 0.4 weight % and up to and including 40 weight %;

(b) one or more nonionic or cationic water-soluble or water-dispersible polymeric binder materials that are present in an amount of at least 0.5 weight % and up to and including 90 weight %; and (c) visible light-scattering particles that have been surface-treated and that are present in an amount of at least 6 weight % and up to and including 90 weight %, wherein the amounts of the (a), (b), and (c) components are based on the total weight of the topcoat composition.

23. The inkjet receiving medium of embodiment 22, wherein the topcoat composition has a dry solids coating weight of at least 0.1 g/m² and up to and including 10 g/m².

24. The inkjet receiving medium of embodiment 22 or 23, wherein the topcoat composition has a dry solids coating weight of at least 0.2 g/m² and up to and including 2 g/m².

25. The inkjet receiving medium of any of embodiments 22 to 24, wherein the topcoat composition has a dry solids coating weight of at least 0.2 g/m² and up to and including 1 g/m².

26. The inkjet receiving medium of any of embodiments 22 to 25, wherein the substrate is a transparent, translucent, or metallized polymeric film.

27. The inkjet receiving medium of any of embodiments 22 to 26, wherein the substrate has an L* value of 50 or less.

28. The inkjet receiving medium of any of embodiments 22 to 27, wherein the topcoat composition has an opacity of at least 30% and a colorimetry defined by an a* value of at least −5 and up to and including +5 and a b* value of at least −5 and up to and including +5.

29. The inkjet receiving medium of any of embodiments 22 to 28, wherein the topcoat composition is disposed on the substrate surface as a continuously distributed layer.

30. The inkjet receiving medium of any of embodiments 22 to 28, wherein the topcoat composition is disposed on the substrate surface as a pattern.

31. The inkjet receiving medium of any of embodiments 22 to 30, wherein the substrate comprises a hydrophobic surface prior to the topcoat composition being disposed thereon, which hydrophobic surface is impermeable to water or to an aqueous pigment-based ink composition, and which topcoat composition provides a hydrophilic surface relative to the hydrophobic surface of the substrate.

32. The inkjet receiving medium of any of embodiments 22 to 30, wherein the substrate is capable of absorbing and transferring an aqueous pigment-based ink colorant to the substrate interior prior to the topcoat composition being disposed thereon.

33. The inkjet receiving medium of any of embodiments 22 to 30, wherein the substrate comprises a water-impermeable support, and a first layer that is disposed on at least one surface of the water-impermeable support and that is underneath the topcoat composition.

34. The inkjet receiving medium of embodiments 33, wherein the water-impermeable support comprises a transparent or translucent polymeric film, or a co-extrudate or a laminate of two or more transparent, translucent, or metallized polymeric films.

35. The inkjet receiving medium of any of embodiments 22 to 34, wherein the topcoat composition further comprises the (d) particles different from the (c) component, in an amount of at least 0.06 weight % and up to and including 10 weight %, based on the total weight of the topcoat composition.

36. The inkjet receiving medium of any of embodiments 22 to 35, wherein the topcoat composition further comprises the (e) a crosslinkable polymeric material that is different from all of the (a), (b), and (c) components, present in an amount of at least 0.1 weight % and up to and including 30 weight %, based on the total weight of the topcoat composition.

37. The inkjet receiving medium of any of embodiments 22 to 36, further comprises the (f) a dispersing aid for the (c) visible light-scattering particles, which (f) dispersing aid is present in an amount of at least 0.2 weight % and up to and including 50 weight %, based on the total weight of the (c) surface-treated visible light-scattering particles.

38. The inkjet receiving medium of any of embodiments 22 to 37, wherein the substrate surface has a static surface energy that is greater than 45 dynes/cm prior to disposition of the topcoat composition.

39. The inkjet receiving medium of any of embodiments 22 to 38, wherein the (f) dispersing aid comprises at least a protonated polyethylene imine or protonated polyvinyl amine.

40. A method for providing an inkjet receiving medium of any of embodiments 21 to 39, the method comprising, in order:

A) providing a substrate; and

B) disposing the aqueous composition of any of embodiments 1 to 20, onto at least one surface of the substrate, to provide an inkjet receiving medium having a topcoat composition on the at least one substrate surface.

41. The method of embodiment 40, comprising disposing the topcoat composition on the substrate surface to provide a continuously distributed layer.

42. The method of embodiment 40 or 41, comprising disposing the topcoat composition using gravure coating or flexographic printing.

43. The method of embodiment 42, comprising disposing the topcoat composition on the substrate surface as a pattern.

44. The method of any of embodiments 40 to 43, comprising disposing the aqueous composition on the substrate surface in-line following preparation of the substrate.

45. The method of any embodiments of the present invention including embodiments 40 to 44 noted above, wherein the substrate comprises a transparent, translucent, or metallized polymeric film, and the method comprising disposing the aqueous composition so that the resulting topcoat composition has a dry solids coating weight of at least 0.2 g/m² and up to and including 2 g/m², and the aqueous composition comprises the following (a), (b), (c), (d), (e), and (f) components:

(a) one or more water-soluble salts of magnesium (+2), calcium (+2), barium (+2), or a mixture thereof, which (a) one or more water-soluble salts are present in an amount of at least 1 weight % and up to and including 25 weight %, based on the total weight of the aqueous composition;

(b) one or more nonionic or cationic water-soluble or water-dispersible polymeric binder materials that comprise at least a polyvinyl alcohol, a polyvinyl amine, a polyethylene imine, a copolymer derived at least in part from vinyl amine and vinyl alcohol, or a combination of two or more of these polymeric materials, (b) one or more nonionic or cationic water-soluble or water-dispersible polymeric binder materials are present in an amount of at least 1 weight % and up to and including 8 weight %, based on the total weight of the aqueous composition;

(c) visible light-scattering particles comprising visible light-scattering titanium dioxide particles that have been surface-treated such that the aqueous composition has a stable zeta potential of greater than +10 millivolts, wherein the surface-treated visible light-scattering titanium dioxide particles exhibit a $D_{50}$ (median) particle size of at least 0.04 μm and up to and including 2 μm, as measured using a particle size analyzer that provides a volume-weighted particle size distribution, and which surface-treated visible light-scattering titanium dioxide particles are present in an amount of at least 10 weight % and up to and including 40 weight %, based on the total weight of the aqueous composition;

(d) particles different from the (c) component, which (d) particles have a Rockwell Hardness of less than or equal to R75, and are present in an amount of at least 0.05 weight % and up to and including 3 weight %, based on the total weight of the aqueous composition;

(e) a crosslinkable polymeric material that is different from all of the (a), (b), (c), and (d) components, and which (e) crosslinkable polymeric material is present in an amount of at least 0.2 weight % and up to and including 8 weight %, based on the total weight of the aqueous composition; and (f) a dispersing aid for the (c) surface-treated visible light-scattering titanium dioxide particles, which (f) dispersing aid is a polymer having a protonated nitrogen atom, and is present in an amount of at least 0.2 weight % and up to and including 50 weight %, based on the total weight of the (c) surface-treated visible light-scattering titanium dioxide particles.

46. The method of embodiment 45, wherein the (f) dispersing aid comprises at least protonated polyethylene imine or protonated polyvinyl amine.

47. A method for inkjet printing, comprising, in order:
A) providing the inkjet receiving medium of any of embodiments 22 to 39; and
B) inkjet printing one or more aqueous pigment-based inks onto the topcoat composition to provide a pigment-based image or layer.

48. The method of embodiment 47, wherein the one or more aqueous pigment-based inks comprise one or more pigment colorants selected from a cyan pigment, a magenta pigment, a yellow pigment, a black pigment, a green pigment, an orange pigment, a white pigment, a red pigment, a blue pigment, a violet pigment, or a combination of any of these pigment colorants.

49. The method of embodiment 47 or 48, wherein the one or more aqueous pigment-based inks independently comprise an anionic polyurethane, a humectant, an anionic (meth)acrylic polymer, an anionic styrene-(meth)acrylic polymer, or any combination of these materials.

50. The method of any of embodiments 47 to 49, further comprising:
C) applying an aqueous colorless ink composition to the pigment-based image or layer.

51. The method of any of embodiments 47 to 50, comprising printing one or more aqueous pigment-based inks onto the topcoat composition that is disposed on the substrate surface as a pattern, to provide a pigment-based image in registration with the pattern of the topcoat composition using an inkjet deposition system.

52. The method of any of embodiments 47 to 51, wherein each of the one or more aqueous pigment-based inks is supplied from respective main fluid supplies as one or more continuous streams, each of which one or more continuous stream is broken into both printing drops and non-printing drops; and collecting and returning the non-printing drops from each of the one or more continuous streams to respective main fluid supplies.

53. The method of any of embodiments 47 to 52, wherein each of the one or more aqueous pigment-based inks has a viscosity of less than or equal to 5 centipoise (5 mPa-sec) as measured at 25° C. using a rolling ball viscometer.

54. The method of any of embodiments 47 to 53, comprising disposing the topcoat composition on the substrate surface in a pattern using flexographic printing, and the B) inkjet printing of one or more aqueous pigment-based inks onto the pattern of the topcoat composition provides a pigment-based image in registration with the pattern of the topcoat composition.

55. The method of any of embodiments 47 to 54, comprising disposing the topcoat composition on the substrate surface, and the B) inkjet-printing, carried out in-line at different stations of a multi-station apparatus.

56. A method for providing an inkjet-printed article, comprising, in order:
A') providing a substrate having a surface,
A") providing an inkjet receiving medium by disposing the aqueous composition of any of embodiments 1 to 20 onto the surface of the substrate to form a topcoat composition; and
B) inkjet printing one or more aqueous pigment-based inks onto the topcoat composition to provide a pigment-based image or layer.

57. An inkjet-printed article comprising:
a substrate comprising a surface;
a topcoat composition disposed on the substrate surface, the topcoat composition derived from the aqueous composition of any of embodiments 1 to 20, and the topcoat composition comprising the following (a), (b), and (c) components:
(a) one or more water-soluble salts of a multivalent metal cation, which (a) one or more water-soluble salts are present in an amount of at least 0.4 weight % and up to and including 40 weight %;
(b) one or more nonionic or cationic water-soluble or water-dispersible polymeric binder materials that are present in an amount of at least 2 weight % and up to and including 90 weight %; and
(c) visible light-scattering particles that have been surface-treated and that are present in an amount of at least 6 weight % and up to and including 90 weight %,
wherein the amounts of the (a), (b), and (c) components are based on the total weight of the topcoat composition; and
disposed over the topcoat composition, a pigment-based inkjet-printed layer or pattern.

58. The inkjet-printed article of embodiment 57, wherein the topcoat composition has a dry solids coating weight of at least 0.1 g/m² and up to and including 10 g/m².

59. The inkjet-printed article of embodiment 57 or 58, wherein the topcoat composition is disposed as a pattern on the substrate surface, and
the pigment-based inkjet-printed pattern is arranged in registration with the pattern of the topcoat composition.

60. The inkjet-printed article of any of embodiments 57 to 59, wherein
an aqueous-based colorless ink composition is disposed on the pigment-based inkjet-printed layer or pattern.

The following Examples are provided to illustrate the practice of this invention and are not meant to be limiting in any manner. The materials for which a particular commercial source is not described, can be obtained from various commercial sources that would be readily apparent to one skilled in the art.

In the following examples, the zeta potentials of the aqueous composition were measured using the Malvern Zetasizer Nano-ZS (ZEN) apparatus and electrophoretic mobility of the tested particles. Samples of aqueous compositions were analyzed in an undiluted state. Zeta potential is measured using a combination of the measurement techniques: Electrophoresis and Laser Doppler Velocimetry, sometimes called Laser Doppler Electrophoresis. This method measures how fast a particle moves in a liquid when an electrical field is applied, that is, its velocity.

Particle size distributions were also obtained using a Horiba LA-920 apparatus using a static light technique that produced a volume-weighted particle size distribution. In this procedure, each sample of particles was diluted with ultrapure water to yield an appropriate amount of light scatter within the limits displayed by the instrument indictors. Each sample was analyzed with low level sonication within the instrument to minimize any aggregation that might exist. Results are typically reported as a mean or median particle size wherein particle size is defined in terms of an equivalent spherical diameter (or ESD).

All of the examples described below labeled with "I" are inventive while examples labeled with "C" are comparative (outside the present invention).

Example 1

Forty weight % titanium dioxide (TiO$_2$) dispersions were prepared in water using a variety of (b) nonionic or cationic water-soluble or water-dispersible polymeric binder materials as dispersants (hereinbelow, "polymer"). To a glass vessel, each polymer was added at the level indicated in the following TABLE I to water and stirred until dissolved. The temperature of the resulting solution was raised if the dissolution rate was too slow. To each polymer solution, Chemours R-960 $TiO_2$ visible light-scattering particles in powder form were added slowly until the powder was wetted out, to provide the necessary (c) surface-treated visible light-scattering particles. The resulting dispersion was then stirred with a high rpm colloid mill for 1 hour. The compatibility with a (a) water-soluble salt of a multivalent metal cation ("salt") was tested by adding 2 weight % magnesium chloride ($MgCl_2$) to the mixture followed by stirring. The results shown below in TABLE I indicate just a single (b) nonionic or cationic water-soluble or water-dispersible polymeric binder material tested, Lupamin® 9095, provided a stable dispersion that was tolerant to salt ("pass"). The titanium dioxide particles that precipitated in the dispersions failed the salt test.

TABLE I

Polymer Concentrations and Results

| Sample | Polymer | Polymer Weight % | Salt |
|---|---|---|---|
| 1.01-I | Lupamin ® 9095 | 2.00 | pass |
| 1.02-I | Lupamin ® 9095 | 4.00 | pass |
| 1.03-I | Lupamin ® 9095 | 8.00 | pass |
| 1.04-C | Selvol ™ 103 | 2.00 | fail |
| 1.05-C | Selvol ™ 103 | 4.00 | fail |
| 1.06-C | Selvol ™ 103 | 8.00 | fail |
| 1.07-C | PVP K-30 | 2.00 | fail |
| 1.08-C | PVP K-30 | 4.00 | fail |
| 1.09-C | PVP K-30 | 8.00 | fail |
| 1.10-C | PVP K-15 | 4.00 | fail |
| 1.11-C | PVP K-120 | 4.00 | fail |
| 1.12-C | PVP 1.3M | 4.00 | fail |
| 1.13-C | PVP 10K | 4.00 | fail |
| 1.14-C | PVP 2K | 4.00 | fail |

"PVP" refers to polyvinyl pyrrolidone

Example 2

Aqueous coating solutions (250 g) were prepared utilizing an inventive polymer and a $TiO_2$ containing dispersion as shown above in TABLE I. To 72.5 g of water was added 29.6 g of Lupamin® 9095 (b) binder material. To this, 0.4 g of Carbowet® 106 surfactant (available for example from Evonik Corporation) was added, then 125.0 g of Chemours R-960 visible light-scattering titanium dioxide particles, after which the dispersion was stirred with a homogenizer at high rpm for 1 hour. Then, 10.9 g of $MgCl_2.6H_2O$ and 1.5 g of Microspersion® 150-50 wax particles (available for example from Micro Powders, Inc.) were added with stirring between steps. Each resulting aqueous composition was coated onto a transparent poly(ethylene terephthalate) substrate using a reverse gravure coating cylinder at a wet laydown of 4.0 g/m². This resulted in Sample 2.01-I.

Sample 2.02-I was made identically to Sample 2.01-I except that 10.0 g of Polycup™ 9700 crosslinker (available for example, from Solenis Specialty Chemicals) was added prior to coating each polyester substrate. A commercial Sun Chemical DPQ-173 white composition available from Sun Chemical was used to coat the transparent polyester substrate to form Sample 2.03-C. All of these samples were provided with the same aqueous coating wet laydowns.

The opacity (determined using the TAPPI opacity test described above) was measured on each resulting inkjet receiving medium. In addition, the three coatings were printed with a standard separation test pattern using a commercial Kodak Stream Continuous Inkjet printer loaded with aqueous cyan, magenta, yellow, and black pigment-based inks (commercially available KODAK PROSPER® Press QD Packaging Inks), all of which have anionically stabilized colored pigments. The maximum optical density ($D_{max}$) achieved for the 3 CMY primary colors and black K aqueous pigment-based inks are shown below in TABLE II. The two Inventive samples (2.01-I and 2.02-I) exhibited superior opacity to the Comparative sample 2.03-C prepared from the commercial fluid and inkjet-printed with high optical density. The Comparative sample also failed in inkjet printing due to excessive ink coalescence caused by lateral ink spread resulting in adjacent ink drops merging before the water has evaporated from the applied ink. The noted Comparative Example coating did not contain a (a) water-soluble salt having a multivalent cation as required in the present invention and this omission led to unacceptable inkjet-printed images.

TABLE II

Hunter Opacity and Printing Results

| Sample | Opacity | $D_{max}$ Black (K) | $D_{max}$ Cyan (C) | $D_{max}$ Magenta (M) | $D_{max}$ Yellow (Y) |
|---|---|---|---|---|---|
| 2.01-I | 77.6 | 1.65 | 1.49 | 1.37 | 1.08 |
| 2.02-I | 77.3 | 1.66 | 1.49 | 1.38 | 1.08 |
| 2.03-C | 74.1 | N/A | N/A | N/A | N/A |

N/A means that the data is not available

Example 3

The Sun Chemical DPQ-173 white precoat composition noted above was evaluated for compatibility with a water-soluble salt having a multivalent metal cation. To 100.0 g of Sun Chemical DPQ-173 white precoat composition was added 2.0 g of $MgCl_2.6H_2O$ salt to form Comparative sample 3.01-C. It was observed that the white pigment in the resulting dispersion precipitated, making the aqueous composition containing the water-soluble salt impossible to coat.

Example 4

This example demonstrates that a separately prepared concentrated pigment dispersion can be used in an aqueous composition according to the present invention. A concentrated pigment dispersion of (c) visible light-scattering particles was prepared by weighing 102.9 g of water into a 500 g glass vessel. To this was added 57.1 g of Lupamin® 9095 (b) binder material with mixing until the polymer was fully incorporated. Then, 240 g of Chemours R-960 titanium dioxide particles was added slowly and mixed under high shear with a colloid mill. Each resulting dispersion contained 60 weight % of the (c) surface-treated visible light-scattering titanium dioxide particles.

Aqueous compositions according to the present invention were prepared using the pigment dispersion as described below in TABLE III. The noted components were added in gram quantity and in the order as indicated and stirred after each addition. The Selvol™ 103 polyvinyl alcohol (available for example from Sekisui Specialty Chemicals) was delivered as a 20 weight % gel solution and the NBK-020322-07E polyurethane polymer manufactured by DCM was delivered as a 40 weight % latex dispersion.

TABLE III

Aqueous Compositions for Example 4

| Component | 4.01-I | 4.02-I | 4.03-I | 4.04-I | 4.05-I | 4.06-I |
|---|---|---|---|---|---|---|
| Distilled water | 16.14 | 14.02 | 11.89 | 7.95 | 0.00 | 0.00 |
| Carbowet ® 106 surfactant | 0.13 | 0.13 | 0.13 | 0.13 | 0.13 | 0.13 |
| Selvol ™ 103 PVOH | 0.00 | 0.00 | 0.00 | 0.00 | 0.00 | 14.88 |
| Lupamin ® 9095 polyvinylamine | 3.04 | 3.04 | 3.04 | 9.11 | 17.20 | 3.04 |
| Chemours R-960 Titanium dioxide dispersion | 49.58 | 49.58 | 49.58 | 49.58 | 49.58 | 49.58 |
| $MgCl_2$—$6H_2O$, food grade | 3.70 | 3.70 | 3.70 | 3.70 | 3.70 | 3.70 |
| Microspersion ® 150-50 wax particles | 0.51 | 0.51 | 0.51 | 0.51 | 0.51 | 0.51 |
| NBK-020322-07E polymer | 8.50 | 10.63 | 12.75 | 10.63 | 10.63 | 10.63 |
| Polycup ™ 9700 crosslinker | 3.40 | 3.40 | 3.40 | 3.40 | 3.40 | 3.40 |

A Comparative precoat composition 4.07-C was prepared similarly to the aqueous compositions described in TABLE III but with the primary difference that no pigment dispersion containing visible light-scattering particles was included.

All seven aqueous compositions were coated by a reverse gravure cylinder onto a poly(ethylene terephthalate) substrate at a wet laydown of 4.0 $g/m^2$. The results are shown below in TABLE IV. The resulting inventive coatings from Samples 4.01-I through 4.06-I were each printed with a standard separation test pattern using a commercial Kodak Stream Continuous Inkjet printer loaded with aqueous pigment-based inks as described above in Example 2 and the resulting prints exhibited excellent density and image quality. Comparative Sample 4.07C displayed low opacity (determined using the TAPPI opacity test described above) due to the lack of (c) surface-treated visible light-scattering particles.

TABLE IV

Results for Example 4 Aqueous Compositions

| Sample | Opacity | $D_{max}$ Black (K) | $D_{max}$ Cyan (C) | $D_{max}$ Magenta (M) | $D_{max}$ Yellow (Y) |
|---|---|---|---|---|---|
| 4.01-I | 67.3 | 1.62 | 1.52 | 1.45 | 1.15 |
| 4.02-I | 66.4 | 1.52 | 1.44 | 1.42 | 1.14 |
| 4.03-I | 65.2 | 1.52 | 1.46 | 1.35 | 1.14 |
| 4.04-I | 64.3 | 1.54 | 1.46 | 1.37 | 1.15 |
| 4.05-I | 63.1 | 1.54 | 1.44 | 1.39 | 1.15 |
| 4.06-I | 62.8 | 1.44 | 1.39 | 1.33 | 1.13 |
| 4.07-C | 3.3 | 1.50 | 1.52 | 1.15 | 1.06 |

Example 5

This example set shows that the dispersion process used in the preceding examples can be applied to other pigments that are (c) visible light-scattering particles of various particle sizes. These dispersions were formulated in the same way as described above in Example 4 except that the dispersions contained 50 weight % of visible light-scattering particles (pigment particles) and the Lupamin® 9095 polyvinyl amine (b) binder material level was set to 5 weight % of the (c) visible light-scattering particle solids. The resulting dispersions were sized using the Horiba particle size analyzer noted above, and all of them passed the "salt" test (described above in Example 1). These dispersions are described in the following TABLE V.

TABLE V

Results for Example 5

| Sample | (c) Visible Light-Scattering Particle Product | (c) Surface-treated Visible Light-Scattering Particles | Mean Diameter (μm) |
|---|---|---|---|
| 5.01-I | Chemours R-960 | $TiO_2$ | 0.65 |
| 5.02-I | Chemours R-900 | $TiO_2$ | 0.59 |
| 5.03-I | Tronox ® CR-826 | $TiO_2$ | 0.61 |
| 5.04-I | KaMin Polygloss ® 90 | Kaolin clay | 36.26 |
| 5.05-I | Nanophase NanoArc ® ZN-2105 | ZnO | 8.50 |
| 5.06-I | Nanophase NanoTek ZnO HS | ZnO | 48.22 |
| 5.07-I | Nanophase NanoTek TI-1501 | $TiO_2$ | 10.73 |

Example 6

This example was carried out similarly to Example 2. The components were added in gram quantity and in the order indicated according to the following TABLE VI. Carbowet® 106 surfactant and Lupamin® 9095 polyvinyl amine (b) binder material were first added to water after which powdered Chemours R-960 surface-treated visible light-scattering titanium dioxide particles was slowly added. The mixtures were stirred with a homogenizer at high rpm for 1 hour. Dry Selvol™ 103 polyvinyl alcohol was added prior to a heat ramp to 90° C. and held for 1 hour. After cooling to 40° C., the remainder of the components were added over 10 minutes of stirring in between each step. Each of the resulting aqueous compositions was coated onto a poly (ethylene terephthalate) substrate using a reverse gravure coating cylinder at a wet laydown of 4.0 $g/m^2$.

TABLE VI

| Aqueous Compositions for Example 6 | | | | | | | | |
|---|---|---|---|---|---|---|---|---|
| Component | 6.01-I | 6.02-I | 6.03-I | 6.04-I | 6.05-I | 6.06-I | 6.07-I | 6.08-C |
| Distilled water | 40.13 | 35.36 | 30.58 | 51.73 | 46.96 | 42.18 | 43.21 | 75.85 |
| Carbowet ® 106 surfactant | 0.15 | 0.15 | 0.15 | 0.15 | 0.15 | 0.15 | 0.15 | 0.15 |
| Lupamin ® 9095 Polyvinylamine | 11.90 | 11.90 | 11.90 | 4.76 | 4.76 | 4.76 | 4.76 | 8.09 |
| Chemours R-960 Titanium dioxide | 30.00 | 30.00 | 30.00 | 30.00 | 30.00 | 30.00 | 30.00 | 0.00 |
| Selvol ™ 103 PVA | 6.70 | 3.35 | 0.00 | 6.70 | 3.35 | 0.00 | 3.35 | 7.01 |
| NBK-020322-07E polymer | 0.00 | 8.13 | 16.25 | 0.00 | 8.13 | 16.25 | 8.13 | 0.00 |
| $MgCl_2$—$6H_2O$ | 4.26 | 4.26 | 4.26 | 3.55 | 3.55 | 3.55 | 3.55 | 4.03 |
| Microspersion ® 150-50 wax particles | 0.60 | 0.60 | 0.60 | 0.60 | 0.60 | 0.60 | 0.60 | 0.60 |
| Polycup ™ 9700 crosslinker | 6.25 | 6.25 | 6.25 | 2.50 | 2.50 | 2.50 | 6.25 | 4.27 |

PVA refers to polyvinyl alcohol

The results are shown below in TABLE VII and indicate excellent opacity (determined using the TAPPI opacity test described above) for the inkjet receiving media derived from the aqueous composition coatings containing the (c) surface-treated visible light-scattering titanium dioxide particles. Each resulting inventive coating was inkjet printed with a standard separation test pattern using a commercial Eastman Kodak Company Stream Continuous Inkjet printer loaded with aqueous pigment-based inks as described above in Example 2 to provide images with excellent density and image quality. Comparative Example 6.08-C was inkjet-printed readily but displayed low opacity due to the absence of the (c) surface-treated visible light-scattering titanium dioxide particles.

TABLE VII

| Results for Example 6 Aqueous Compositions | | | | | |
|---|---|---|---|---|---|
| Sample | Opacity | $D_{max}$ Black (K) | $D_{max}$ Cyan (C) | $D_{max}$ Magenta (M) | $D_{max}$ Yellow (Y) |
| 6.01-I | 49.4 | 1.29 | 1.32 | 1.18 | 1.04 |
| 6.02-I | 57.8 | 1.38 | 1.34 | 1.22 | 1.08 |
| 6.03-I | 58.3 | 1.48 | 1.40 | 1.30 | 1.11 |
| 6.04-I | 53.2 | 1.26 | 1.31 | 1.18 | 1.05 |
| 6.05-I | 57.8 | 1.31 | 1.32 | 1.21 | 1.07 |
| 6.06-I | 57.5 | 1.44 | 1.37 | 1.26 | 1.09 |
| 6.07-I | 59.7 | 1.35 | 1.33 | 1.21 | 1.07 |
| 6.08-C | 2.5 | 1.60 | 1.55 | 1.11 | 1.04 |

Example 7

The aqueous compositions formulated and used in this example were like those described in Example 6 except that the pigment dispersion containing (c) visible light-scattering titanium dioxide particles was created using an alternative (b) nonionic or cationic water-soluble or water-dispersible polymeric binder material, Lupasol® FG polyethylene imine (b) binder material, that was first added to water and the pH was adjusted to 7.0 with 5 molar HCl. Then, powdered Chemours R-900 surface-treated titanium dioxide was slowly added. The resulting mixture was stirred with a homogenizer at high rpm for 1 hour. Carbowet® 106 surfactant was added and followed by dry Selvol™ 103 polyvinyl alcohol prior to a heat ramp to 90° C. and held for 1 hour. After cooling to 40° C., Lupamin® 9095 polyvinyl amine (b) binder material, $MgCl_2$, and Polycup™ 9700 crosslinker were added with 10 minutes of stirring in between each step. Each resulting aqueous composition was coated onto a poly(ethylene terephthalate) substrate using a reverse gravure coating cylinder at a wet laydown of 4.0 g/m² to form an inkjet receiving medium. The Lupasol® FG polyethylene imine and Lupamin® 9095 polyvinyl amine materials were varied in two formulas as indicated below in TABLE VIII. Each resulting inkjet receiving medium was analyzed for the opacity (determined using the TAPPI opacity test described above) and printed with a continuous inkjet printer as described above. The Comparative Sample shown in TABLE VIII was prepared identically to Comparative Sample 6.08-C. High opacity and excellent printing results were obtained for the two Inventive samples 7.01-I and 7.02-I but the Comparative sample 7.03-C exhibited low opacity due to the absence of (c) surface-treated visible light-scattering particles in the topcoat composition under the inkjet-printed image.

TABLE VIII

| Results for Example 7 | | | | | | | | |
|---|---|---|---|---|---|---|---|---|
| Sample | Lupasol ® Polymer wt. % | Lupamin ® (b) polymer wt. % | Selvol ™ PVA wt. % | Opacity | $D_{max}$ Black (K) | $D_{max}$ Cyan (C) | $D_{max}$ Magenta (M) | $D_{max}$ Yellow (Y) |
| 7.01-I | 1.50 | 2.00 | 6.00 | 60.3 | 1.50 | 1.44 | 1.41 | 1.08 |
| 7.02-I | 4.50 | 0.00 | 6.00 | 61.1 | 1.52 | 1.45 | 1.42 | 1.09 |
| 7.03-C | 0 | 1.7 | 6.80 | 2.6 | 1.62 | 1.52 | 1.20 | 1.03 |

Example 8

This example shows the efficacy of using a white pigment (Chemours R-900, surface-treated titanium dioxide visible light-scattering particles) in combination with a less expensive extender (KaMin Polygloss® 90, kaolin clay) in order to reduce the overall cost of the aqueous composition. The components were added in gram quantity and in the order indicated according to the following TABLE IX. The same procedure was used as described above in Example 7. The KaMin Polygloss® 90 extender was added just after or in place of the Chemours R-900 (c) surface-treated visible light-scattering titanium dioxide particles.

TABLE IX

Aqueous Compositions for Example 8

| Component | 8.01-I | 8.02-I | 8.03-I | 8.04-I | 8.05-I | 8.06-I | 8.07-I | 8.08-C |
|---|---|---|---|---|---|---|---|---|
| Distilled water | 66.03 | 81.03 | 96.03 | 81.03 | 96.03 | 66.03 | 66.03 | 114.19 |
| Lupasol ® FG PEI* | 2.25 | 2.25 | 2.25 | 2.25 | 2.25 | 2.25 | 2.25 | 0.00 |
| Chemours R-900 $TiO_2$ | 45.00 | 30.00 | 15.00 | 0.00 | 0.00 | 15.00 | 30.00 | 0.00 |
| KaMin Polygloss ® 90 | 0.00 | 0.00 | 0.00 | 30.00 | 15.00 | 30.00 | 15.00 | 0.00 |
| Carbowet ® 106 surfactant | 0.23 | 0.23 | 0.23 | 0.23 | 0.23 | 0.23 | 0.23 | 0.23 |
| Selvol ™ 103 PVA | 9.28 | 9.28 | 9.28 | 9.28 | 9.28 | 9.28 | 9.28 | 10.52 |
| Lupamin ® 9095 polyvinylamine | 14.29 | 14.29 | 14.29 | 14.29 | 14.29 | 14.29 | 14.29 | 12.14 |
| $MgCl_2$—$6H_2O$ | 6.53 | 6.53 | 6.53 | 6.53 | 6.53 | 6.53 | 6.53 | 6.53 |
| Polycup ™ 9700 crosslinker | 6.40 | 6.40 | 6.40 | 6.40 | 6.40 | 6.40 | 6.40 | 6.40 |

PVA refers to polyvinyl alcohol;
PEI refers to polyethyleneimine

The noted aqueous compositions were analyzed for zeta potential prior to coating onto a substrate. The Comparative sample 8.08-C had no visible-light-scattering particles and so zeta potential was not applicable. All the Inventive samples 8.01-I through 8.07-I displayed a positive zeta potential that rendered the aqueous compositions stable in the presence of the (a) water-soluble magnesium chloride salt. Each of the aqueous compositions was coated onto a poly(ethylene terephthalate) support using a reverse gravure coating cylinder at a wet laydown of 4.0 g/m². The Chemours R-900 (c) surface-treated visible light-scattering titanium dioxide particles and KaMin Polygloss® 90 particles were varied in the formulations as indicated in the following TABLE X. Each coating was analyzed for opacity (using the TAPPI opacity test described above) and printed with a continuous inkjet printer. The results for each of the Inventive aqueous compositions containing the (c) surface-treated visible light-scattering particles indicate the efficacy of combining one or more of these types of such particles to achieve a desired opacity and cost while maintaining excellent print quality as part of a continuous ink jet system. However, the Comparative aqueous composition 8.08-C exhibited low opacity due to the absence of (c) surface-treated visible light-scattering particles in the inkjet-printed surface of the inkjet receiving medium.

TABLE X

Results for Example 8

| Sample | Chemours R-900 wt. % | KaMin Polygloss ® wt. % | Opacity | Zeta Potential mV | $D_{max}$ Black (K) | $D_{max}$ Cyan (C) | $D_{max}$ Magenta (M) | $D_{max}$ Yellow (Y) |
|---|---|---|---|---|---|---|---|---|
| 8.01-I | 30 | 0 | 59.7 | 15.8 | 1.56 | 1.44 | 1.32 | 1.08 |
| 8.02-I | 20 | 0 | 44.3 | 19.7 | 1.28 | 1.32 | 1.17 | 1.03 |
| 8.03-I | 10 | 0 | 24.5 | 19.3 | 1.38 | 1.38 | 1.17 | 1.04 |
| 8.04-I | 0 | 20 | 13.2 | 19.9 | 1.64 | 1.42 | 1.12 | 1.03 |
| 8.05-I | 0 | 10 | 8.6 | 19.6 | 1.61 | 1.44 | 1.12 | 1.01 |
| 8.06-I | 10 | 20 | 48.1 | 17.9 | 1.65 | 1.52 | 1.31 | 1.09 |
| 8.07-I | 20 | 10 | 57.0 | 17.8 | 1.61 | 1.55 | 1.34 | 1.09 |
| 8.08-C | 0 | 0 | 2.1 | N/A | 1.70 | 1.55 | 1.14 | 1.05 |

Example 9

This example shows the zeta potential measurement to be predictive for when a pigment dispersion containing (c) surface-treated visible light-scattering particles will be stable in the presence of a (a) water-soluble salt like magnesium chloride. Each dispersion was prepared by dissolving a (b) nonionic or cationic water-soluble or water-dispersible polymeric binder material in water, adding the dry pigment containing (c) surface-treated visible light-scattering particles, and then mixing the dispersion with a homogenizer at high rpm for 1 hour. In all cases, the pigment concentration was 5 weight %. The first four dispersions contained no (f) dispersing aid, and the first three dispersion contained a buffer solution rather than water. The (f) dispersing aid level shown below in TABLE XI is given as a weight % of the pigment loading. The stability to the (a) water-soluble salt was determined by adding 2 weight % of $MgCl_2$ to the dispersion after it was made. The Inventive dispersions that remained stable are listed as "pass" while the Comparative dispersions from which the (c) surface-treated visible light-scattering particles precipitated are listed as "fail".

TABLE XI

Example 9 Dispersion Parameters and Test Results

| Sample | (f) Dispersing Aid | Wt. % (f) Dispersing Aid | Solvent Medium | pH | Zeta Potential (mV) | Salt Test |
|---|---|---|---|---|---|---|
| 9.01-C | none | 0 | pH 7 buffer | 6.99 | −12.4 | fail |
| 9.02-C | none | 0 | pH 4 buffer | 3.99 | −8.8 | fail |
| 9.03-C | none | 0 | pH 10 buffer | 9.99 | −12.8 | fail |
| 9.04-C | none | 0 | DI water | 7.09 | −11.4 | fail |
| 9.05-I | Lupamin ® 9095 Polyvinylamine | 10 | DI water | 7.15 | 22.5 | pass |
| 9.06-I | Polyethyleneimine | 10 | DI water | 10.48 | 12.8 | pass |
| 9.07-C | Selvol ™ 103 PVA | 10 | DI water | 6.57 | −7.2 | fail |
| 9.08-C | PVP K30 | 10 | DI water | 5.90 | −11.1 | fail |
| 9.10-C | Carbowet ® 106 surfactant | 10 | DI water | 6.68 | −9.1 | fail |

Without exception, the Inventive 9.05-I and 9.06-I dispersions with a positive zeta potential were stable with the (a) water-soluble magnesium chloride salt, but the Comparative dispersions outside the present invention, were not.

Example 10

To 224 g of distilled water was added 0.75 g of Carbowet® 106 surfactant and 47.6 g of Lupamin® 9095 polyvinyl amine. To this solution was added 150 g of Chemours R-960 to produce a dispersion of (c) surface-treated visible light-scattering titanium dioxide particles. Each resulting dispersion was then stirred in a colloid mill for 3 hours with small samples taken every 30 minutes. After milling, 33.5 g of dry Selvol™ 103 polyvinyl alcohol was added with marine propeller stirring and heated to 90° C. for 2 hours with a small sample taken every 30 minutes. After cooling to 40° C., 19.6 g of $MgCl_2.6H_2O$ was added to each dispersion and stirring was carried out for 10 minutes to prepare aqueous compositions. A total of 12 samples were taken from each aqueous composition and measured for zeta potential and particle size using the Horiba instrument described above. The results are shown below in TABLE XII. All the samples except the first two had a fine particle size and a positive zeta potential. One should note that a positive zeta potential alone should not be used by itself as a measure of an optimal aqueous composition, as a large particle size can indicate agglomerated visible light-scattering particles.

TABLE XII

Example 10 Samples Taken During Dispersion and Aqueous Composition Making Process

| Sample | Method Step | Method step time (min) | Mean Diameter (μm) | Zeta Potential (mV) |
|---|---|---|---|---|
| 10.01-I | dispersion | 0 | 229.82 | 32.9 |
| 10.02-I | dispersion | 30 | 0.73 | 25.0 |
| 10.03-I | dispersion | 60 | 0.09 | 25.1 |
| 10.04-I | dispersion | 90 | 0.09 | 22.5 |
| 10.05-I | dispersion | 120 | 0.10 | 22.6 |
| 10.06-I | dispersion | 150 | 0.10 | 20.5 |
| 10.07-I | dispersion | 180 | 0.10 | 23.2 |
| 10.08-I | heating at 90° C. | 30 | 0.08 | 11.9 |
| 10.09-I | heating at 90° C. | 60 | 0.08 | 15.1 |
| 10.10-I | heating at 90° C. | 90 | 0.09 | 14.4 |
| 10.11-I | heating at 90° C. | 120 | 0.08 | 14.8 |
| 10.12-I | when salt added | 10 | 0.09 | 14.4 |

Example 11

This example shows the utility of a (b) nonionic or cationic water-soluble or water-dispersible polymeric binder material according to the invention to stabilize a greater variety of pigments containing visible light-scattering particles suitable for aqueous compositions and topcoat compositions according to the present invention. Each dispersion sample was prepared using a Sigma-Aldrich low MW polyethylene imine (f) dispersing aid to shift the ionic charge in the pigment dispersions. Each aqueous dispersion (100 g) was prepared so it each contained 10 weight % of pigment containing (c) visible light-scattering particles. Each candidate pigment was tested with and without (f) dispersing aid added to each dispersion. The dispersions that contained the (b) binder material were adjusted to a nominal pH of 6 using 1 molar hydrochloric acid. All dispersions were stirred using a homogenizer at high rpm for 1 hour. Particle size and zeta potential were measured in the resulting aqueous compositions containing the (a) water-soluble salt to explain the results of the MgCl$_2$ salt test described earlier.

TABLE XIII

Results of the Example 11 Samples

| Sample | Pigment Product | Wt. % (b) Binder Material | Measured pH | Zeta Potential (mV) | Mean Diameter (μm) | Salt Test |
|---|---|---|---|---|---|---|
| 11.01-C | Chemours R-960 | 0 | 7.31 | −4.8 | 3.43 | fail |
| 11.02-I | Chemours R-960 | 10 | 6.04 | 21.5 | 0.19 | pass |
| 11.03-C | Chemours R-900 | 0 | 7.29 | −6.8 | 1.73 | fail |
| 11.04-I | Chemours R-900 | 10 | 6.01 | 13.4 | 0.29 | pass |
| 11.05-C | Chemours R-706 | 0 | 7.3 | −9.1 | 2.54 | fail |
| 11.06-I | Chemours R-706 | 10 | 5.93 | 14.2 | 0.52 | pass |
| 11.07-C | Tronox ® CR-826 | 0 | 7.32 | −7.5 | 0.50 | fail |
| 11.08-I | Tronox ® CR-826 | 10 | 5.99 | 14.1 | 0.20 | pass |
| 11.09-C | Grace SM 405 | 0 | 7.3 | −19.8 | 5.06 | fail |
| 11.10-I | Grace SM 405 | 10 | 6 | 28.7 | 8.08 | pass |
| 11.11-C | KaMin Polygloss ® 90 | 0 | 7.32 | −15.4 | 3.28 | fail |
| 11.12-I | KaMin Polygloss ® 90 | 10 | 5.99 | 29.9 | 0.42 | pass |

The results shown above indicate that all the tested pigments containing (c) visible light-scattering particles had a native negative surface charge that made the Comparative aqueous compositions containing no (b) binder material incompatible with the (a) water-soluble multivalent metal salt. All the pigments underwent a surface charge reversal with the (b) binder material, rendering a different mean particle size and aqueous compositions tolerant to the (a) water-soluble multivalent metal salt.

Example 12

This example shows the ability of a (b) nonionic or cationic water-soluble or water-dispersible polymeric binder material according to the invention to stabilize the Chemours R-960 surface-treated visible light-scattering titanium dioxide particles over a range of pH conditions. Each dispersion (100 g) was prepared so it contained 5 weight % pigment and a (b) binder material level that was 10% of the pigment solids. The dispersion formulas were adjusted for pH after the (b) binder material had been dissolved in distilled water. The pH adjustments were made using 1% percent hydrochloric acid and 0.5 molar sodium hydroxide. After adding the pigment to the pH-adjusted (b) binder material solution, each dispersion was stirred using a homogenizer at high rpm for 1 hour. Zeta potential and the 2% MgCl$_2$ salt stability test were conducted on the final aqueous compositions containing the (a) water-soluble salt. The results are shown below in TABLE XIV. All three (b) binder materials over a range of pH from 6 to 9 provided positive surface charged (c) surface-treated visible light-scattering particles that were compatible with the (a) water-soluble salt.

TABLE XIV

Results of Example 12 Samples

| Sample | (b) Binder Material | (b) Binder Material pH | Zeta Potential (mV) | Salt Test |
|---|---|---|---|---|
| 12.01-I | Lupamin ® 9095 | 7.38 | 41.0 | pass |
| 12.02-I | Lupamin ® 9095 | 6.01 | 55.4 | pass |
| 12.03-I | Lupamin ® 9095 | 8.03 | 29.5 | pass |
| 12.04-I | Lupamin ® 9095 | 8.99 | 30.0 | pass |
| 12.05-I | Sigma-Aldrich low MW PEI* | 9.03 | 24.0 | pass |
| 12.06-I | Sigma-Aldrich low MW PEI | 8.00 | 17.3 | pass |
| 12.07-I | Sigma-Aldrich low MW PEI | 7.02 | 15.7 | pass |
| 12.08-I | Sigma-Aldrich low MW PEI | 6.03 | 11.6 | pass |
| 12.09-I | Lupasol ® SC61B | 9.00 | 13.1 | pass |
| 12.10-I | Lupasol ® SC61B | 7.98 | 22.5 | pass |
| 12.11-I | Lupasol ® SC61B | 6.99 | 22.6 | pass |
| 12.12-I | Lupasol ® SC61B | 5.99 | 22.5 | pass |

*"PEI" refers to polyethylene imine

Example 13

This example evaluated the ability of a range of different (b) binder materials to act as (f) dispersing aids and to stabilize the Chemours R-960 pigment containing (c) visible light-scattering particles according to the present invention. Each dispersion (100 g) was prepared so that it contained 5 weight % pigment and a (b) binder material level that was 10 weight % of the pigment solids. Each dispersion formula was adjusted to a pH of 7 after the (b) binder material had been dissolved in distilled water, using 1 weight % hydrochloric acid or 0.5 molar sodium hydroxide depending upon which direction the solution needed to go to achieve a final pH of 7. After adding the pigment to the pH adjusted (b) binder material solution, each dispersion was stirred using a homogenizer at high rpm for 1 hour. Zeta potential, Horiba particle sizing, and the 2 weight % MgCl$_2$ salt test were conducted on each final aqueous composition. The results are shown below in TABLE XV. In all samples without exception, the (b) binder materials capable of achieving charge reversal and a positive zeta potential were compatible with the (a) water-soluble salt. In addition, the positively charged pigment particle dispersions were on average smaller than the negatively-charged pigment particle dispersions.

TABLE XV

Results for Example 13 Samples

| Sample | (b) Binder Material | Start pH | Final pH | Zeta Potential (mV) | Mean Diameter (μm) | Salt Test |
|---|---|---|---|---|---|---|
| 13.01-I | Sigma-Aldrich PEI | 10.69 | 6.90 | 13.0 | 0.100 | pass |
| 13.02-I | Lupasol ® SC61B | 10.50 | 7.03 | 19.5 | 0.105 | pass |
| 13.03-I | Polymin SK | 7.68 | 6.98 | 16.1 | 0.098 | pass |
| 13.04-I | Lupasol ® FG | 10.86 | 7.02 | 18.9 | 0.090 | pass |
| 13.05-I | Lupasol ® G20 | 10.87 | 7.03 | 15.3 | 0.092 | pass |
| 13.06-I | Lupasol ® P | 10.60 | 7.05 | 10.4 | 0.092 | pass |
| 13.07-I | Lupamin ® 9095 | 7.63 | 7.04 | 24.6 | 0.058 | pass |
| 13.08-I | Lupamin ® 9050 | 7.33 | 7.04 | 22.7 | 0.074 | pass |
| 13.09-I | Lupamin ® 9030 | 7.70 | 7.06 | 27.3 | 0.069 | pass |
| 13.10-C | Selvol ™ Ultiloc 2012 | 6.90 | 6.90 | −10.0 | 0.099 | fail |
| 13.11-C | Selvol ™ Ultiloc 4005 | 6.85 | 6.85 | −12.6 | 3.679 | fail |
| 13.12-I | Selvol ™ Ultiloc 5003 | 10.80 | 6.95 | 12.2 | 0.065 | pass |
| 13.13-C | Selvol ™ Ultiloc 5103 | 7.55 | 7.55 | −4.3 | 3.076 | fail |

The Selvol ™ polymers are available from Sekisui Specialty Chemicals

Example 14

This example evaluated the ability of Lupasol® P and Lupasol® FG polymeric materials to produce three different pigment dispersions containing (c) surface-treated visible light-scattering titanium dioxide particles. Each dispersion (100 g) was prepared so that it contained 30 weight % of $TiO_2$ particles and a (b) binder material level that was either 5 weight % or 15 weight % of the $TiO_2$ solids. Each dispersion formula was adjusted to a pH of 7 after the noted (b) binder material had been dissolved in distilled water, using 5 molar hydrochloric acid. After adding the $TiO_2$ particles to each pH adjusted polymer solution, the resulting dispersions was stirred with a homogenizer at high rpm for 1 hour. Zeta potential, particle size, and the 2 weight % $MgCl_2$ salt test were conducted on each final aqueous composition. The results are shown below in TABLE XVI. The results indicate that the noted polymer was able to successfully disperse all three of the $TiO_2$-containing pigments at both (b) binder material to $TiO_2$ percentages to provide aqueous compositions according to the present invention for pretreating a substrate for inkjet printing.

Example 15

The aqueous compositions formulated and used in this example were like those described above in Example 7. Lupasol® P (13.5 g) containing (b) a nonionic or cationic water-soluble or water-dispersible polymeric binder material was first added to 74.5 g of water and the pH of the resulting (b) binder material solution was adjusted to 7.0 with 5 molar HCl. Then, 45.0 g of powdered Chemours R900 titanium dioxide particles was slowly added to each (b) binder material solution to produce a dispersion of (c) surface-treated visible-light scattering titanium dioxide particles. The resulting mixture was stirred for 1 hour. To it was added 0.23 g of Carbowet® 106 surfactant followed by 9.28 g of dry Selvol™ 103 polyvinyl alcohol prior to a heat ramp to 90° C. and holding for 1 hour. After cooling to 40° C., 6.53 g of $MgCl_2$ and 0.96 g Polycup® 9700 crosslinker were added with 10 minutes of stirring in between each step. A magnetic stir bar was used for mixing the samples in all steps with one exception. In Inventive sample 15.02-I, a high shear homogenizer was added to the mixing during the one-hour dispersion step. The results are shown below in TABLE XVII, where it is observed that the degree of mixing in the dispersion step had little impact on the zeta potential of the final aqueous composition.

TABLE XVI

Results for Example 14 Samples

| Sample | (b) Binder Material | Light-Scattering Particles | Wt. % (b) Binder Material | Median Diameter (μm) | Zeta Potential (mV) | Salt Test |
|---|---|---|---|---|---|---|
| 14.01-I | Lupasol ® P | Chemours R900 | 5 | 0.092 | 23.0 | pass |
| 14.02-I | Lupasol ® P | Chemours R900 | 15 | 0.080 | 22.5 | pass |
| 14.03-I | Lupasol ® P | Chemours R706 | 5 | 0.066 | 21.6 | pass |
| 14.04-I | Lupasol ® P | Chemours R706 | 15 | 0.064 | 21.4 | pass |
| 14.05-I | Lupasol ® P | Tronox CR-826 | 5 | 0.055 | 21.5 | pass |
| 14.06-I | Lupasol ® P | Tronox ® CR-826 | 15 | 0.069 | 22.1 | pass |
| 14.07-I | Lupasol ® FG | Chemours R900 | 5 | 0.511 | 6.8 | pass |
| 14.08-I | Lupasol ® FG | Chemours R706 | 15 | 0.042 | 10.0 | pass |
| 14.09-I | Lupasol ® FG | Tronox ® CR-826 | 5 | 0.043 | 4.2 | pass |
| 14.10-I | Lupasol ® FG | Tronox ® CR-826 | 15 | 0.044 | 5.3 | pass |

TABLE XVII

Results for Example 15 Samples

| Sample | Dispersion Mixing | Zeta Potential (mV) |
|---|---|---|
| 15.01-I | magnet | 4.8 |
| 15.02-I | magnet + homogenizer | 4.9 |

Example 16

This example evaluated the ability of Selvol™ Ultiloc 5003 vinyl amine/vinyl alcohol copolymer (available from Sekisui Specialty Chemicals) as a (b) nonionic or cationic water-soluble or water-dispersible polymeric binder material to stabilize a dispersion of (c) surface-treated visible light-scattering titanium dioxide particles.

Each dispersion (100 g) was prepared so that it contained a (b) binder material level that was a variable weight percent of the $TiO_2$ solids. Each dispersion was adjusted to a pH of 7.5 after the (b) binder material had been added to distilled water, using 5 molar hydrochloric acid. The (b) binder material was in dried form and was dissolved during a heat ramp to 90° C. and held for 1 hour. After cooling to 40° C., Chemours R-900 titanium dioxide particles was added to each (b) binder material dispersion and mixed with a magnetic stir bar for 1 hour to produce dispersions of (c) surface-treated visible light-scattering titanium dioxide particles. Zeta potential and the 2 weight % $MgCl_2$ salt test (described above in Example 1) were conducted on each final aqueous compositions. The results are shown below in TABLE XVIII, where it can be seen that Selvol™ Ultiloc 5003 vinyl amine/vinyl alcohol copolymer was necessary to shift the zeta potential positive and to stabilize the dispersion containing the (a) water-soluble salt.

TABLE XVIII

Results for Example 16 Samples

| Sample | (b) Binder Material Wt. % of (c) Surface-treated Visible Light-Scattering Particles | Zeta Potential (mV) | Salt Test |
|---|---|---|---|
| 16.01-C | 0.0 | −10.7 | fail |
| 16.02-I | 1.0 | 9.9 | pass |
| 16.03-I | 2.0 | 9.7 | pass |
| 16.04-I | 4.0 | 9.5 | pass |

Example 17: Use of Aqueous Compositions to Prepare Inkjet Printed Articles

Commercially available, non-primed, impermeable polymer film substrates such as generally used transparent biaxially oriented polyethylene terephthalate (BOPET) and aluminum metalized BOPET (m-BOPET) films and Jindal's BICOR™ LPX-2 biaxially oriented polypropylene (BOPP) were used as substrates to prepare inkjet receiving media according to the present invention.

Aqueous Compositions:

The following aqueous compositions were prepared according to the present invention and used in the following examples to form topcoat compositions onto the various substrates noted above: These four aqueous compositions (01N-1, 08C-1, 08C-2B, and 10B-1) were prepared similarly to those described above but utilized different materials added in varying sequences. The components were added in gram quantity according to the following TABLE XIX.

TABLE XIX

| Component | 01N-1 | 08C-1 | 08C-2B | 10B-1 |
|---|---|---|---|---|
| Distilled water | 670.63 | 1106.39 | 1242.72 | 2432.54 |
| Carbowet® 106 | 2.25 | 3.75 | 3.75 | 7.50 |
| SELVOL™ 103 PVOH | 100.52 | 0.00 | 167.53 | 0.00 |
| SELVOL™ Ultiloc 5003 | 0.00 | 162.50 | 0.00 | 260.00 |
| LUPAMIN® 9095 | 142.86 | 386.90 | 238.10 | 619.05 |
| Chemours R900 $TiO_2$ | 0.00 | 625.00 | 625.00 | 1250.00 |
| Chemours R960 $TiO_2$ | 450.00 | 0.00 | 0.00 | 0.00 |
| $MgCl_2$—$6H_2O$ | 58.75 | 108.79 | 97.91 | 217.58 |
| Microspersion 150-50 | 9.00 | 0.00 | 15.00 | 0.00 |
| POLYCUP® 9700 | 66.00 | 106.67 | 110.0 | 213.33 |

Aqueous Composition 01N-1:

Carbowet® 106 and Lupamin® 9095 were first added to water after which powdered Chemours R960 titania was slowly added as the (c) visible light-scattering particles. The mixture was stirred with a homogenizer at high rpm for 1 hour. Dry Selvol™ 103 was added prior to a heat ramp to 90° C. and held for 1 hour with good mixing. After cooling to 40° C., the remainder of the components were added in the order listed with 10 minutes of stirring in between each step. P 10

Aqueous Composition 08C-1:

Carbowet® 106 was first added to water after which powdered Chemours R900 titania was slowly added as the (c) visible light-scattering particles. The mixture was stirred with a homogenizer at high rpm for 2 hours. Dry Selvol™ Ultiloc 5003 was added and the pH was adjusted to 7.5 with concentrated HCl prior to adding Lupamin® 9095. This was followed by a heat ramp to 90° C. and held for 1 hour with high shear mixing. After cooling to 40° C., the remainder of the components were added in the order listed with 10 minutes of stirring in between each step.

Aqueous Composition 08C-2B:

Carbowet® 106 and Lupamin® 9095 were first added to water after which powdered Chemours R900 titania was slowly added as the (c) visible light-scattering particles. The mixture was stirred with a homogenizer at high rpm for 2 hours. Dry Selvol™ 103 was added prior to a heat ramp to 90° C. and held for 1 hour with high shear mixing. After cooling to 40° C., the remainder of the components were added in the order listed with 10 minutes of stirring in between each step.

Aqueous Composition 10B-1:

Carbowet® 106 was first added to water after which powdered Chemours R900 titania was slowly added as the (c) visible light-scattering particles. The mixture was stirred with a homogenizer at high rpm for 2 hours. Dry Selvol™ Ultiloc 5003 was added and the pH was adjusted to 7.5 with concentrated HCl prior to adding Lupamin® 9095. This was followed by a heat ramp to 90° C. and held for 1 hour with high shear mixing. After cooling to 40° C., the remainder of the components were added in the order listed with 10 minutes of stirring in between each step.

A topcoat composition was formed on each of the identified substrates using an appropriate aqueous composition according to the present invention, as are identified above. The titanium dioxide level in the resulting topcoat compositions was reduced by 20%. Prior to applying the aqueous composition, each substrate was treated with a corona discharge device when required to provide acceptable wetting at a treatment energy density applied to the bare film surface of about 80 W-min/m². The substantially similar aqueous compositions were then applied to the substrates using a roll-fed RK PrintCoat Instruments Ltd. Rotary Koater and either reverse gravure or smooth roller offset gravure coating procedure.

Typically, the reverse gravure coating process delivered 5.0-7.5 cm³/m² wet laydown of aqueous composition. The single station gravure desirably used a 60° hex engraving, 250 liter/inch (98.4 liter/cm), 14.8 BCM cylinder (100 line/cm, 23.0 cc/m²). The reverse gravure coating transfer efficiency could be varied by changing the ratio of coating roller to web speed ratio; higher speed ratios gave lower wet coverages. The speed ratios varied from 1.0 to 1.8. In offset gravure, the coating was first transferred to a smooth roller that was pressed against the web by a metal backing roller to form a nip with the web. The gravure roller, smooth transfer roller, and metal backing roller were all geared together to move at a common speed. Typically, the offset coating process delivered 5.8-6.3 cm³/m² wet laydown of aqueous composition. In both the reverse and offset coating processes, the coated substrates were dried in-line using hot air dryers that produced a web temperature of at least about 40° C., resulting in a dry topcoat composition coverage range of 1.8-2.6 g/m² on inkjet receiving media having opacities ranging from 52% to 56%.

Each of the resulting ink-receptive media was then either inkjet-printed in-line with one or more CIJ imprinting systems, or each was spooled onto cores for later sheet-fed printing using a single-color 1-inch (2.54 cm) printhead on a benchtop apparatus employing pressurized containers for ink delivery, or a full-width four-color CIJ printing system supplied with pump-pressurized recirculating ink using a fluid (main supply) station. In each experiment, the inkjet receiving media were printing with aqueous cyan, magenta, yellow, or black pigment-based inks (commercially available KODAK PROSPER® Press QD Packaging Inks), all of which contain anionically-stabilized pigments.

In-Line Coating and Printing:

In a representative procedure, the ink reservoirs of a roll-fed continuous inkjet printing test stand fixture were charged with aqueous cyan and magenta pigment-based inks. The roll-fed printing test fixture was connected in-line, downstream from an RK PrintCoat Instruments Ltd. Rotary Koater gravure coating applicator allowing the roll-fed, uncoated flexible transparent or metalized substrate to first be pre-coated with an aqueous composition according to this invention to form a white topcoat composition (or layer) in an inkjet receiving medium as described previously, to be at least partially dried, and then inkjet-printed using one or more in-line KODAK PROSPER® S10 Imprinting Systems employing a full-width (4.25-inch (10.8 cm)) Stream™ 600 nozzle per inch (236 nozzle per cm) continuous inkjet printhead module enabling either 600×600 dot per inch (236×236 dots per cm) addressability, or 600×900 dpi (236×354 dpcm). The corresponding drop volumes at these resolutions were about 9.8 and 11.4 picaliters, respectively. The imprinting system consisted of the following elements:

(1) two fluid system stations capable of (a) pressurizing the aqueous pigment-based cyan and magenta inks in excess of 60 psid (0.41 MPa) thereby producing ink volumetric flow rates of up to about 2 liters/min; (b) delivering pressurized anionically-stabilized aqueous cyan and magenta pigment-based inks as indicated in TABLE XX below, from continuous inkjet printhead drop generator modules; (c) returning unprinted (or unused) ink under vacuum to their respective fluid system ink reservoirs; (d) detecting the reservoir ink concentrations by electrical resistivity measurement and replenishing the aqueous pigment-based cyan or magenta inks with replenisher fluid if they had been concentrated by water evaporation, and adding more aqueous cyan or magenta pigment-based inks to their respective ink reservoirs instead if it was depleted by use in printing and was at the correct colorant concentrations; and (e) providing the printheads with Printhead Cleaning and Storage Fluid to flush the nozzles and duct systems in order to restore accurate printing after fouling by dried ink build-up, and to shut down the system for safe storage over significant time durations;

(2) a roll transport system with an encoder to detect and precisely regulate the transport speed of the substrate and synchronize a control unit to initiate and terminate image printing;

(3) continuous inkjet printhead PIC box assemblies each including (a) a KODAK PROSPER® Press Jetting Module with a MEMS silicon-based drop generator to form printing and non-printing drops of aqueous pigment-based inks and a Coanda gutter to catch non-printing drops when the printer was not printing an image file or when it is not printing a given pixel even if it is printing an image file; (b) a non-printing drop deflection apparatus creating a deflection zone intersecting the drop curtain provided by positive and negative air duct assemblies to direct the non-printing drops to the Coanda gutter, and (c) an ink return line to the fluid system ink reservoir, and (4) a print controller that (a) synchronizes the web spatial location in accord with the data feed to the jetting module and also (b) transmits electrical signals to the jetting module CMOS circuitry that renders a raster processed image into pixel by pixel ink stream stimulation instructions using nozzle plate heater pulse patterns by optimized waveforms to generate non-printing catch drops and printing drops of aqueous pigment-based ink delivered at the printing substrate surface pixel locations, as required.

Each fluid system utilized a Micropump Inc. MICROPUMP® series GJ-N23DB380A gear pump to deliver the ink through a Pall Corp. Disposable Filter Assembly capsule filter, DFA4201ZU0045, containing 0.45 μm nominal effective pore size ULTIPOR® GF-HV glass fiber media at about 65 psid (0.45 MPa) pressure drop at the nozzle plate, which generated a uniform drop velocity of about 20 m/sec. The fluid system gear pump speed setting was continually adjusted to provide and maintain constant fluid pressure at the jetting module to uniformly produce the desired drop velocity as per the system specification. The required system parameter settings for proper jetting and accurate aqueous cyan or magenta pigment-based ink replenishments were determined and recorded to a computer file termed an "inkdex" to enable printing on other systems, such as a web press fitted two-up with production KODAK PROSPER® S10 Imprinting Systems. The deflected non-printing ink drops were caught on a Coanda gutter and returned to the fluid system ink tank under vacuum. Sustained operation of the printer in catch mode of the non-printing drops resulted in gradual evaporation of the aqueous ink solvent vehicle. Aqueous cyan and magenta pigment-based ink concentrations were maintained to within about 5% of the original aqueous pigment-based ink concentrations by addition of the particle-free Replenisher Fluid to it if the latter became more than about 5% concentrated based on an ink electrical resistivity determination. Test targets were raster image processed to produce digital printing signal instructions for each pixel location at the appropriate transport speed of the test substrate at 600×600 pixels per inch (ppi) (236×236 pixels per centimeter (ppcm)).

Various test images were printed at different substrate transport speeds—using a 600 nozzles/inch (236 nozzles/cm) PROSPER® Press Jetting Module in a production print-head assembly configuration, which produced a 4.25-inch (10.8 cm) jet curtain print swath.

In order to investigate ink durability and ink cohesive strength of inkjet-printed articles, it was useful to 1) print each color separately with a tint series ranging from 10 to 100% (at steps of 10%) or 2) print the magenta tint series in register over a 100% tint of cyan image. The resulting inkjet-printed articles were dried in-line using a 0.7 m hot air dryer followed by a high velocity air knife and were wound up in roll form before chopping out segments in sheet form for further testing. The drying system produced single color inkjet-printed ink surface temperatures of at least about 43° C. and two-color inkjet-printed ink surface temperatures of at least about 40° C. Speeds were typically 40 feet/min (12 meters/min).

To assess the level of ink drying and the ability of the white topcoat composition in the ink receptive layer to absorb and manage ink humectant, a sample of the inkjet-printed article as described above was evaluated subjected to a finger rub test or ink cohesion tape test. The finger rub was carried out using a back and forth rub; and the rub was carried out after adjusting the pressure of the rub on a scale to give about 300 g of load. At a given ink laydown in a single or two-color image, the level of ink movement from a finger rub was rated as good (no ink movement), fair (slight ink movement), or poor (heavy ink movement).

For the tape test, a piece of 3M™ SCOTCH® Transparent Tape, Catalog No. 600 was placed on the inkjet-printed article top surface as it was resting on a solid countertop, using 4-6 passes of firm pressure applied to the tape back side with a human finger. The tape was then manually peeled slowly away from the sample article over a 6-8 second duration. The tape was observed for any transfer of inkjet-printed image to the tape (cohesive or adhesive failure) and the results were ranked as good (no ink transfer), fair (some ink transfer), or poor (high amount of ink transfer). A well dried and humectant managed ink will have strong adhesion to the tape in the adhesion test and there will be little to no transfer of ink to the tape. A similar test was carried out on the non-printed areas. After peeling, the tape was observed for any transfer of white topcoat composition to the tape (considering a % area removal).

The following TABLE XX indicates that good adhesion of the unprinted areas were observed on the clear BOPP and BOPET and metalized PET substrates. Little to no removal of the opaque ink receptive layer was removed using the tape test. Similarly, ink cohesion was good to prevent little or no removal of ink using the tape test. The finger rub tests showed that under some conditions an overprint varnish may be useful to provide an optimal dry rub test.

In the column of TABLE XX below that is labeled "Ink (% Humectant)", "Gly" is an identifier for glycerol, "1,2-PD" is an identifier for 1,2-propanediol, and "TEG" is an identifier for triethylene glycol.

TABLE XX

Summary of In-line Coating and Printing

| Base Film | Aqueous Composition | Coating | Opacity % | Coating Adhesion (% Removal) | Ink (% Humectant) | Printer/ Resolution/ Speed | Cyan Rub Test | Magenta Rub Test | Cyan Tape Test | Magenta Tape Test |
|---|---|---|---|---|---|---|---|---|---|---|
| 18 μm LPX-2 BOPP | 01N-1 | In-line with Printing | 60% | 0% | C (4% Gly) M (6.5% Gly) | S-Series 600 × 600 40 fpm | Good to 100% | Good to 100% | Good to 100% | Good to 100% |
| 12 μm PET | 01N-1 | In-line with Printing | 58% | 0% | C (4% Gly) M (6.5% Gly) | S-Series 600 × 600 40 fpm | Good to 100% | Good to 100% | Good to 100% | Good to 100% |
| 18 μm LPX-2 BOPP | 08C-2B | In-line with Printing | 55% | 0% | C (6% 1,2 PD) M (6.5% Gly) | S-Series 600 × 600 40 fpm | Good to 100% | Fair to 100% | Good to 100% | Good to 100% |
| 18 μm m-PET | 08C-2B | In-line with Printing | n/a | 5% | C (6% 1,2 PD) M (6.5% Gly) | S-Series 600 × 600 40 fpm | Good to 40% Fair 50-70% Poor >70% | Fair to 20% Poor >20% | Good to 100% | Good to 100% |
| 18 μm LPX-2 BOPP | 08C-1 | In-line with Printing | 59% | 0% | C (6% 1,2 PD) M (6.5% Gly) | S-Series 600 × 600 40 fpm | Good to 100% | Fair to 60% Poor >60% | Good to 100% | Good to 100% |
| 18 μm m-PET | 08C-1 | In-line with Printing | n/a | 0% | C (6% 1,2 PD) M (6.5% Gly) | S-Series 600 × 600 40 fpm | Fair to 100% | Fair to 90% Poor >90% | Good to 100% | Good to 100% |
| 18 μm LPX-2 BOPP | 10B-1 | In-line with Printing | 56% | 0% | C (6% 1,2 PD) M (4% 1,2 PD & 2% TEG) | S-Series 600 × 600 40 fpm | Good to 100% | Good to 100% | Good to 100% | Good to 100% |
| 18 μm m-PET | 10B-1 | In-line with Printing | n/a | 0% | | S-Series 600 × 600 40 fpm | Fair to 100% | Fair to 100% | Good to 100% | Good to 100% |

Multi-Color Fixture for Printing on White Inkjet Receiving Media:

The fixture consisted of the following elements: (1) a pressure vessel fluid system for each color ink (aqueous cyan, magenta, yellow, and black pigment-based inks) capable of pressurizing the aqueous pigment-based inks in excess of 60 psid (0.41 MPa) thereby producing ink volumetric flow rates through a typical 600-nozzle/inch (236 nozzle/cm) MEMS silicon nozzle plate of about 63 ml/min/inch (24.8 ml/min/cm) of printhead nozzle plate; (2) a fluid manifold delivering pressurized ink to a miniaturized version of a KODAK PROSPER® Press Jetting Module drop generator to form printing and non-printing drops of aqueous pigment-based inks using a 4.16 inch (10.57 cm) nozzle plate; (3) a drop selection system consisting of (a) a gutter to catch non-printing drops when the printer is not printing an image file or when it is not printing a given pixel even if it is printing an image file; (b) a non-printing drop deflection apparatus creating a deflection zone intersecting the drop curtain provided by positive and negative air duct assemblies to direct those drops to the gutter, and (c) a catch pan connected to a waste fluid line to remove the unprinted ink; (4) a vacuum drum capable of supporting a sheet of porous media (for example, uncoated free sheet paper) or non-porous media (for example, coated or uncoated polymer film) and spinning it continuously at precise speeds synchronized with a control unit to simulate web transport of the printing substrate in roll form; and (5) a print controller that (a) controls the printing drum speed and synchronizes the drum location in accord with the data feed to the miniature jetting module drop generator and also (b) transmits electrical signals to the jetting module CMOS circuitry that renders a raster processed image into pixel by pixel ink stream stimulation instructions using nozzle plate heater pulse patterns by optimized waveforms to generate non-printing catch drops and printing drops of ink delivered at the precise printing substrate surface pixel locations, as required.

The printing apparatus drum was loaded with a single sheet of inkjet receiving medium according to this invention, having a topcoat composition on a polymeric film substrate that was affixed by its back side to a sheet of paper for convenience in handling. The drum was moved under each color module and rotated at 325 ft/min (98.5 m/min), printing in 4-color register. The printed sheet was removed and allowed to air dry at ambient temperature and humidity overnight, or it was incubated at 60° C. in a laboratory oven for about 5 minutes before testing and further processing. This process was used to create color linearization and IT8 color printing targets to develop ICC color profiles for 4-color roll fed printing. A color profile was developed for opaque aqueous compositions 01N-1 applied at a dry laydown of 3.4 g/m². The opacity of the white topcoat composition on the LPX-2 BOPP was 57%.

4-Color Roll-Fed Printing of Previously Coated White Inkjet Receiving Medium:

Similar to the printing system for the 2-color system just described a multi-color roll-fed printing system was used which had enhanced drying and in-track registration. This engineering press was capable of up to 7-color printing using KODAK PROSPER® S-series print modules described earlier. In this press, two clam-shell dryers were placed around a 1.6 m diameter drum. On the first third of the drum circumference were 12 mid-IR lamps that sit between the hot air vents. This press allowed higher speed printing and allowed the preparation of finished print rolls for subsequent post coating of varnishes on the Rotary Koater.

Several rolls of LPX-2 BOPP were coated with opaque aqueous composition 01N-1 applied at a dry laydown of 3.4 g/m². Several thousand feet (or meters) of a customer's 4-color hot dog (weiner) packaging job was printed on the noted printer at a speed of 250 ft/min (75.8 m/min). Image quality and detail were excellent and there was no ink offsetting in the machine or damage to the printed image.

Application of Aqueous Overprint Varnish to Inkjet Printed Articles:

An aqueous varnish from Sun Chemical (Northlake, Ill., USA) SunEvo™ EV-AW002 was applied to the rolls of Sapphire XGV hot dog (weiner) printing described above using offset gravure. The post-coating process delivered 5.5-6.5 cm³/m² wet laydown of varnish. The single station gravure used a 60° hex engraving, 250 liter/inch (98.4 liter/cm), 14.8 BCM cylinder (100 line/cm, 23.0 cm³/m²). The varnished articles were dried in-line using 3×0.7 m hot air dryers that produced a web temperature of at least about 50° C., resulting in a dry varnish layer coverage range of 2.5-2.9 g/m². The gloss of the resulting coating was measured at 60° to be about 18 units.

The invention has been described in detail with particular reference to certain preferred embodiments thereof, but it will be understood that variations and modifications can be achieved within the spirit and scope of the invention.

PARTS LIST

10 inkjet receiving medium
20 inkjet recording medium
30 inkjet-printed article
100 substrate
110 topcoat composition
200 support
210 first layer
215 substrate
220 topcoat composition
300 substrate
310 water-impermeable support
320 first layer
330 topcoat composition
340 aqueous-based inkjet-printed image or layer
350 post-print functional layer

The invention claimed is:

1. A method for inkjet printing, comprising, in order:
    A) providing an inkjet receiving medium comprising a substrate and a topcoat composition disposed on a surface thereof, which topcoat composition comprises the following (a), (b), and (c) components:
        (a) one or more water-soluble salts of a multivalent metal cation, which (a) one or more water-soluble salts are present in an amount of at least 0.4 weight % and up to and including 40 weight %;
        (b) one or more nonionic or cationic water-soluble or water-dispersible polymeric binder materials that are present in an amount of at least 0.5 weight % and up to and including 90 weight %; and
        (c) visible light-scattering particles that have been surface-treated so that the surface-treated visible light-scattering particles have a stable zeta potential of greater than +4 millivolts (mV) using one or more (f) dispersing aids, and which surface-treated visible light-scattering particles are present in an amount of at least 6 weight % and up to and including 90 weight %,
        wherein the one or more (f) dispersing aids are each cationic in cumulative charge, are different from the (a) one or more water-soluble salts of a multivalent metal cation, and are present in the topcoat composition in an amount of at least 0.2 weight % and up to and including 50 weight %, based on the total weight of the (c) surface-treated visible light-scattering particles, and
        wherein the amounts of the (a), (b), and (c) components are based on the total weight of the topcoat composition; and
    B) inkjet printing one or more aqueous pigment-based inks onto the topcoat composition to provide a pigment-based image or layer.

2. The method of claim 1, further comprising:
C) applying an aqueous colorless ink composition to the pigment-based image or layer.

3. The method of claim 1, comprising printing one or more aqueous pigment-based inks onto the topcoat composition that is disposed on the substrate surface as a pattern, to provide a pigment-based image in registration with the pattern of the topcoat composition using an inkjet deposition system.

4. The method of claim 1, wherein each of the one or more aqueous pigment-based inks is supplied from respective main fluid supplies as one or more continuous streams, each of which one or more continuous streams is broken into both printing drops and non-printing drops; and
collecting and returning the non-printing drops from each of the one or more continuous streams to respective main fluid supplies.

5. The method of claim 1, wherein each of the one or more aqueous pigment-based inks has a viscosity of less than or equal to 5 centipoise (5 mPa-sec) as measured at 25° C. using a rolling ball viscometer.

6. The method of claim 1, comprising disposing the topcoat composition on the substrate surface in a pattern using flexographic printing, and the B) inkjet printing of one or more aqueous pigment-based inks onto the pattern of the topcoat composition provides a pigment-based image in registration with the pattern of the topcoat composition.

7. The method of claim 1, comprising disposing the topcoat composition on the substrate surface, and the B) inkjet printing, carried out in-line at different stations of a multi-station apparatus.

8. The method of claim 1, wherein the substrate comprises a transparent, translucent, or metallized polymeric film, or a co-extrudate or a laminate of two or more transparent, translucent, or metallized polymeric films.

9. The method of claim 1, wherein the topcoat composition has a dry solids coating weight of at least 0.1 $g/m^2$ and up to and including 2 $g/m^2$.

10. The method of claim 1, wherein the topcoat composition further comprises:
(d) particles different from the (c) component, which (d) particles have a Rockwell Hardness of less than or equal to R90, and which are present in an amount of at least 0.06 weight % and up to and including 10 weight %, based on the total weight of the topcoat composition.

11. The method of claim 1, wherein the topcoat composition further comprises:
(e) a crosslinkable polymeric material that is different from all of the (a), (b), and (c) components, and which (e) crosslinkable polymeric material is present in an amount of at least 0.1 weight % and up to and including 30 weight %, based on the total weight of the topcoat composition.

12. The method of claim 1, wherein the (b) one or more nonionic or cationic water-soluble or water-dispersible polymeric binder materials comprise at least a polyvinyl alcohol, a polyethylene imine, a polyethylene oxide, a polyvinyl amine, a copolymer derived at least in part from vinyl alcohol and ethylene oxide, a copolymer derived at least in part from vinyl amine and vinyl alcohol, or a combination of two or more of these materials.

13. The method of claim 1, wherein the (f) dispersing aid is a polymer having a protonated nitrogen atom.

14. The method of claim 1, wherein the (b) one or more nonionic or cationic water-soluble or water-dispersible polymeric binder materials comprise at least a polyvinyl amine, a polyethylene imine, a polyvinyl alcohol, or a copolymer derived at least in part from vinyl amine and vinyl alcohol, and the (f) dispersing agent comprises at least a protonated polyethylene imine or protonated polyvinyl amine.

15. The method of claim 1, wherein the (c) surface-treated visible light-scattering particles comprise silicon dioxide, zinc oxide, titanium dioxide, zirconium oxide, aluminum oxide, barium sulfate, magnesium oxide, or a combination of two or more of these materials.

16. The method of claim 1, wherein the substrate comprises a transparent polymeric film, and the topcoat composition has a dry solids coating weight of at least 0.2 $g/m^2$ and up to and including 2 $g/m^2$, and the topcoat composition comprises:
the (a) one or more water-soluble salts of magnesium (+2), calcium (+2), barium (+2), or a mixture thereof, which (a) one or more water-soluble salts are present in an amount of at least 0.4 weight % and up to and including 40 weight %, based on the total weight of the topcoat composition;
the (b) one or more nonionic or cationic water-soluble or water-dispersible polymeric binder materials that comprise at least a polyvinyl alcohol, a polyvinyl amine, polyethylene imine, a copolymer derived at least in part from vinyl amine and vinyl alcohol, or a combination of two or more of these polymeric materials, the (b) one or more nonionic or cationic water-soluble or water-dispersible polymeric binder materials are present in an amount of at least 2 weight % and up to and including 90 weight %, based on the total weight of the topcoat composition;
the (c) visible light-scattering particles comprising visible light-scattering titanium dioxide particles, which have been surface-treated to have a stable zeta potential of greater than +4 millivolts (mV) using a (f) dispersing aid described below, and which surface-treated visible light-scattering titanium dioxide particles that exhibit a Dso particle size of at least 0.04 μm and up to and including 2 μm, as measured using a particle size analyzer that provides a volume-weighted particle size distribution, and which surface-treated visible light-scattering titanium dioxide particles are present in an amount of at least 6 weight % and up to and including 90 weight %, based on the total weight of the topcoat composition;
(d) particles different from the (c) component, which (d) particles have a Rockwell Hardness of less than or equal to R75, and which are present in an amount of at least 0.06 weight % and up to and including 10 weight %, based on the total weight of the topcoat composition;
(e) a crosslinkable polymeric material that is different from all of the (a), (b), (c), and (d) components, and which (e) crosslinkable polymeric material is present in an amount of at least 0.1 weight % and up to and including 20 weight %, based on the total weight of the topcoat composition; and
(f) the dispersing aid for the (c) surface-treated visible light-scattering titanium dioxide particles, which (f) dispersing aid is a polymer having a protonated nitrogen atom and is present in the topcoat composition in an amount of at least 0.2 weight % and up to and including 50 weight %, based on the total weight of the (c) surface-treated visible light-scattering titanium dioxide particles.

17. A method for providing an inkjet-printed article, comprising, in order:

A') providing a transparent substrate having a surface,

A") providing an inkjet receiving medium by disposing an aqueous composition onto the surface of the substrate to form a topcoat composition, which aqueous composition has at least 2% solids and up to and including 90% solids, and the aqueous composition comprises the following (a), (b), and (c) components:

(a) one or more water-soluble salts of a multivalent metal cation, which (a) one or more water-soluble salts are present in an amount of at least 0.5 weight % and up to and including 30 weight %;

(b) one or more nonionic or cationic water-soluble or water-dispersible polymeric binder materials that are present in an amount of at least 0.1 weight % and up to and including 30 weight %; and (c) visible light-scattering particles that have been surface-treated such that the aqueous composition has a stable zeta potential of greater than +4 millivolts using one or more (f) dispersing aids, and which surface-treated visible light-scattering particles are present in an amount of at least 5 weight % and up to and including 60 weight %, wherein the one or more (f) dispersing aids are each cationic in cumulative charge, are different from the (a) one or more water-soluble salts of a multivalent metal cation, and are present in the topcoat composition in an amount of at least 0.2 weight % and up to and including 50 weight %, based on the total weight of the (c) surface-treated visible light-scattering particles, and wherein the amounts of the (a), (b), and (c) components are based on the total weight of the aqueous composition; and B) inkjet printing one or more aqueous pigment-based inks onto the topcoat composition to provide a pigment-based image or layer.

18. The method of claim 1, wherein the topcoat composition disposed on the surface of the substrate that is transparent, has an opacity of at least 30%.

19. The method of claim 1, wherein each of the one or more (f) dispersing aids has at least one protonated nitrogen atom, and are present in an amount of at least 1 weight % and up to and including 20 weight %, based on the total weight of the (c) surface-treated visible light-scattering particles.

20. The meth of claim 1, wherein the one or more (f) dispersing aids are chosen from a protonated polyvinyl amine, a protonated polyethylene imine, a copolymer derived at least in part from vinyl amine, or a combination of two or more of such materials.

* * * * *